United States Patent
Hinton et al.

(10) Patent No.: US 11,204,789 B2
(45) Date of Patent: Dec. 21, 2021

(54) GRAPHICAL USER INTERFACE FOR MACRO GENERATION, MODIFICATION, AND VERIFICATION

(71) Applicant: Hyland Software, Inc., Westlake, OH (US)

(72) Inventors: Edward Hinton, Dover, NH (US); Frank Pulito, Berlin, MA (US); Greg Giannone, Ayer, MA (US); Jonathan Ferrin, Derry, NH (US); Zachary Chupka, Pelham, NH (US)

(73) Assignee: HYLAND SOFTWARE INC., Westlake, OH (US)

( * ) Notice: Subject to any disclaimer, the term of this patent is extended or adjusted under 35 U.S.C. 154(b) by 25 days.

(21) Appl. No.: 16/564,665

(22) Filed: Sep. 9, 2019

(65) Prior Publication Data

US 2021/0055944 A1    Feb. 25, 2021

Related U.S. Application Data

(63) Continuation-in-part of application No. 16/545,628, filed on Aug. 20, 2019.

(51) Int. Cl.
*G06F 9/455* (2018.01)
*G06F 8/34* (2018.01)
*G06F 16/901* (2019.01)

(52) U.S. Cl.
CPC ............ *G06F 9/45512* (2013.01); *G06F 8/34* (2013.01); *G06F 16/9024* (2019.01)

(58) Field of Classification Search
USPC .......................................................... 717/115
See application file for complete search history.

(56) References Cited

U.S. PATENT DOCUMENTS

| | | | |
|---|---|---|---|
| 7,299,451 B2 | 11/2007 | Dygon et al. | |
| 7,398,469 B2 | 7/2008 | Kisamore et al. | |
| 7,529,977 B2 | 5/2009 | Parvathy et al. | |
| 7,644,367 B2 | 1/2010 | McKeon et al. | |
| 8,060,791 B2 | 11/2011 | Hayutin | |
| 2007/0294586 A1 | 12/2007 | Parvathy et al. | |
| 2009/0133000 A1 | 5/2009 | Sweis et al. | |
| 2017/0287198 A1* | 10/2017 | Feng | G06T 17/005 |
| 2017/0315791 A1* | 11/2017 | Mascaro | G06F 8/20 |
| 2018/0189113 A1* | 7/2018 | Bequet | G06F 16/9014 |
| 2019/0179638 A1* | 6/2019 | Hao | G06F 16/9024 |
| 2019/0196795 A1* | 6/2019 | Cavalier | G06F 9/45512 |
| 2019/0227777 A1* | 7/2019 | ChoFleming, Jr. | G06F 15/82 |

\* cited by examiner

*Primary Examiner* — John Q Chavis
(74) *Attorney, Agent, or Firm* — Medley, Behrens & Lewis, LLC

(57) ABSTRACT

A graphical user interface (GUI) for an automation application is described herein. The automation applications present the GUI on a display. The GUI displays a directed graph representing a macro for a target application. The directed graph comprises nodes and directed edges connecting the nodes. Each node in the node in the nodes is assigned to an input received by the target application during recording of the macro. Each directed edge is assigned criteria that are to be satisfied in order to traverse each directed edge. Responsive to receiving a modification to the directed graph, the automation application displays a modified directed graph based upon the modification. The automation application generates a modified macro based upon the modified directed graph.

20 Claims, 19 Drawing Sheets

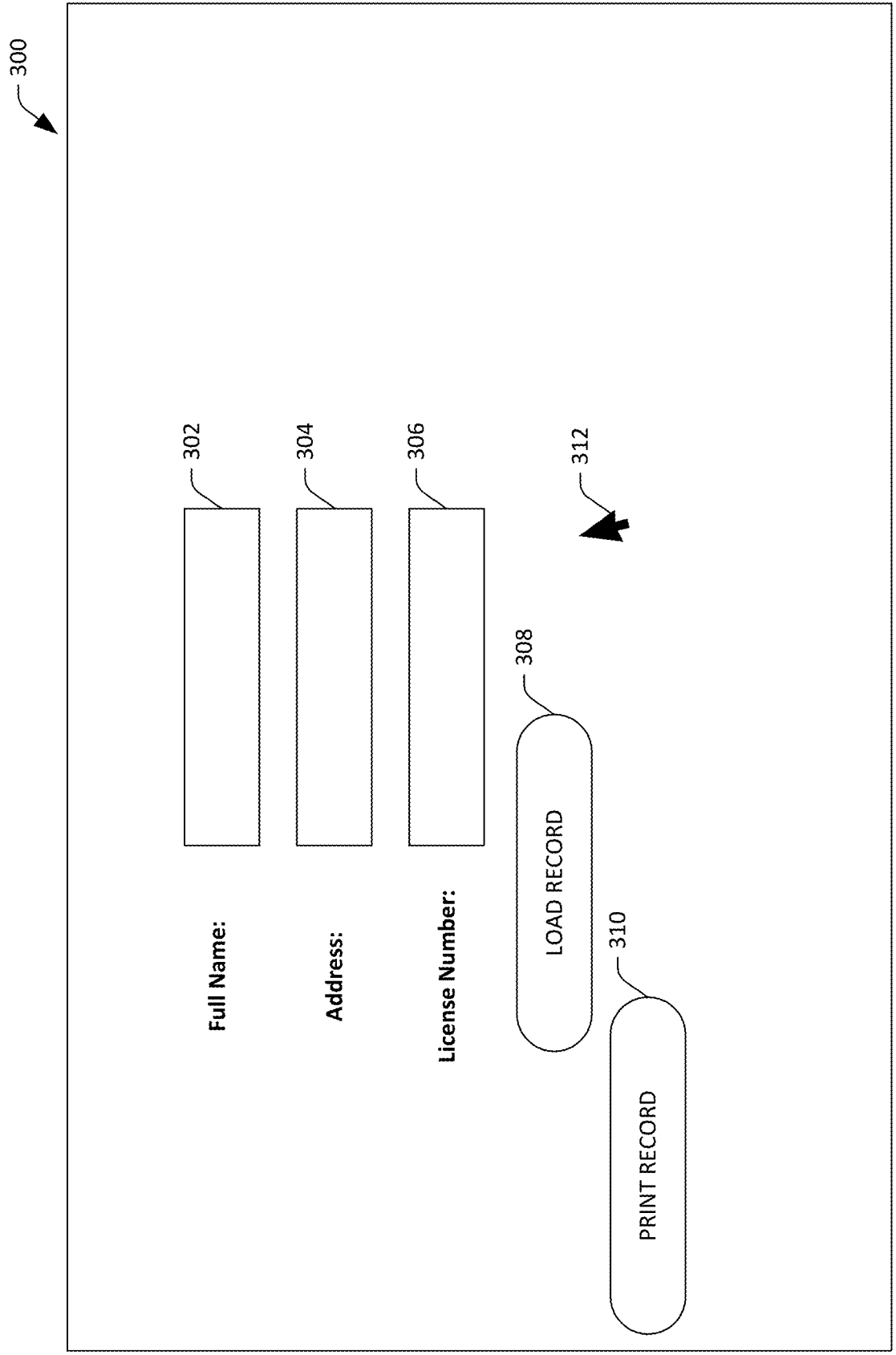

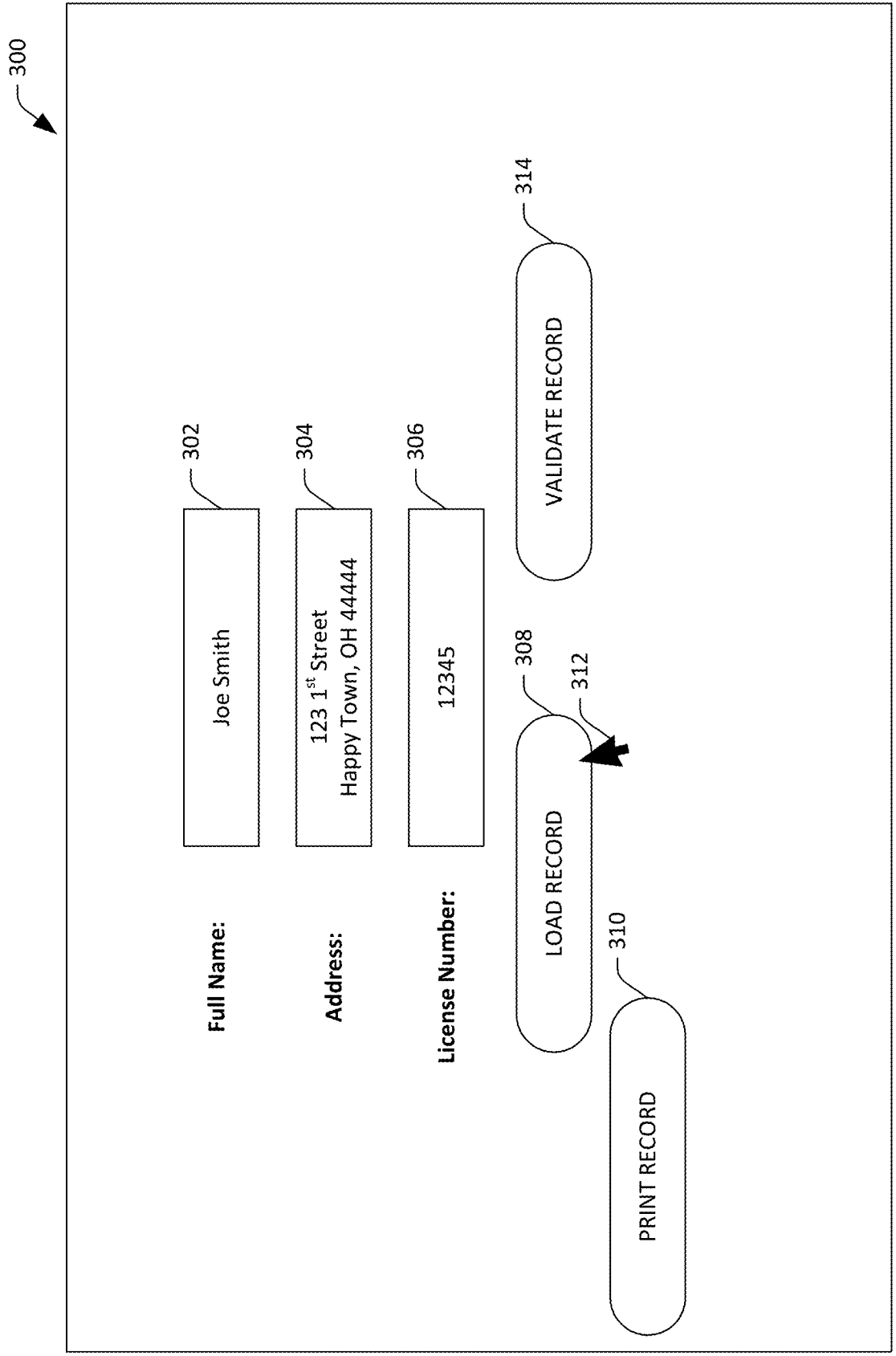

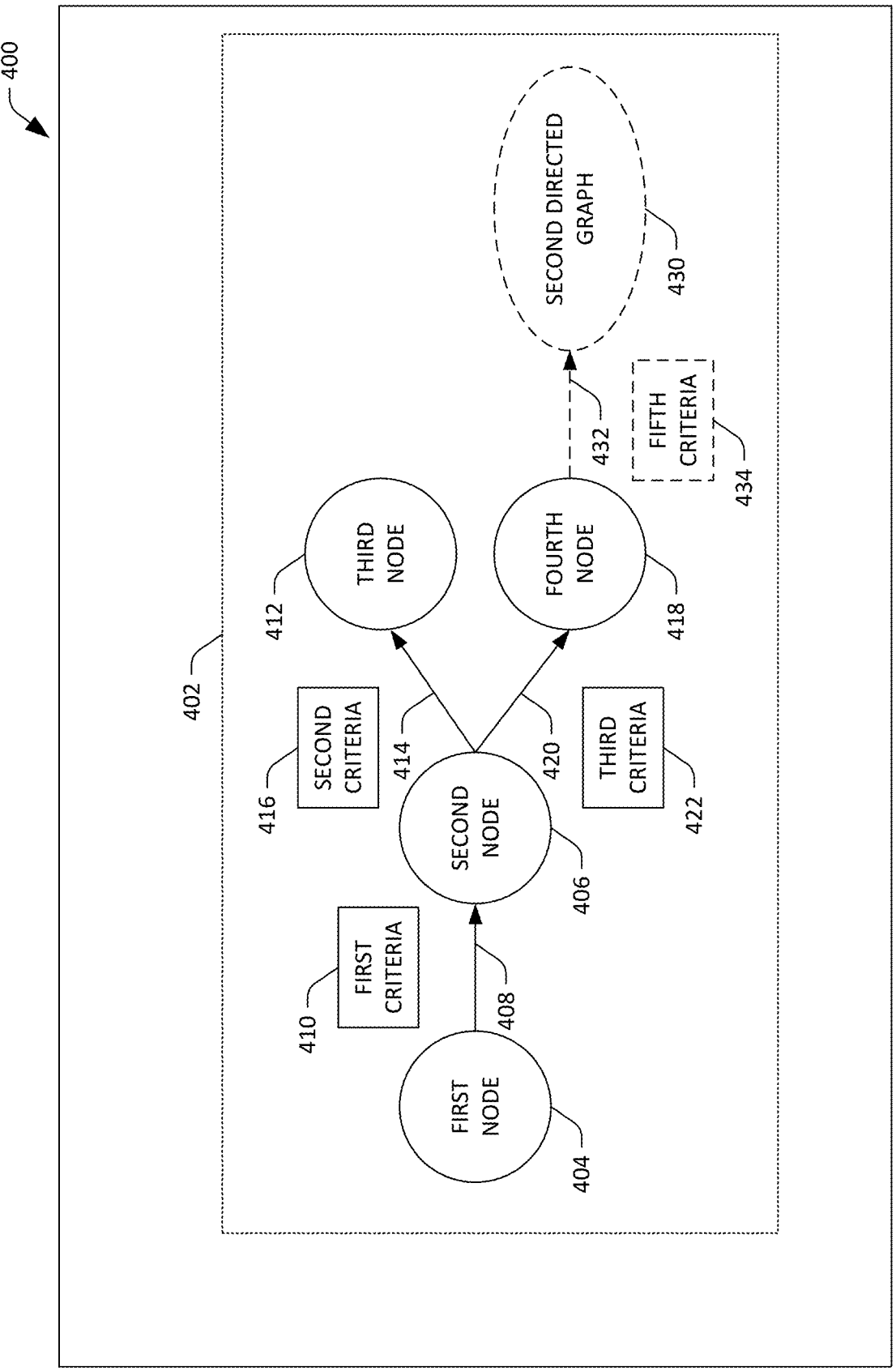

GRAPHICAL USER INTERFACE FOR MACRO GENERATION, MODIFICATION, AND VERIFICATION

CROSS-REFERENCE TO RELATED APPLICATIONS

This application is a continuation-in-part of U.S. patent application Ser. No. 16/545,628, filed on Aug. 20, 2019, and entitled "COMPUTING SYSTEM FOR MACRO GENERATION, MODIFICATION, VERIFICATION, AND EXECUTION", the entirety of which is incorporated herein by reference.

FIELD

This disclosure relates to graphical user interfaces for macro generation and modification.

BACKGROUND

Computer-executable applications perform actions (e.g., generating data, modifying data, transmitting data, and/or retrieving data from data sources) based upon mechanisms configured by developers of the applications. In an example, an application may include support for a display and input devices such as a keyboard and a mouse. The application may present a graphical user interface (GUI) on the display that depicts parameters for actions that can be performed by the application. A user of the application may view the parameters within the GUI. The application may receive input by way of the input devices, and the application may perform the actions based upon the input. Alternatively, the application may cause another application to perform the actions based upon the input.

In another example, the application may be configured to perform actions by way of application programming interfaces (APIs). An API enables the application to perform actions via programmatic calls that are received by the application. Alternatively, the API may enable the application to cause another application to perform the actions via the programmatic calls.

In certain scenarios, an application may not be configured with a publicly accessible API or may lack an API entirely. In other scenarios, the application may be configured with a publicly accessible API, but a user of the application may not have the requisite programming knowledge to utilize the publicly accessible API. In these scenarios, the application typically receives manual input from a user to operate, which can be burdensome, subject to errors, and sacrifice functionality. In order to address this problem, several conventional approaches have been developed.

A conventional approach to the above-referenced problem is to generate macros for an application via conventional macro recorders. In general, conventional macro recorders are configured to record a sequence of inputs (e.g., keystrokes and/or mouse clicks) received by the application from a user. A computing device may then later execute the conventional macro to mimic the sequence of inputs to the application, thereby causing the application to perform an action. In an example, the sequence of inputs may cause the application to retrieve data from a data source or to generate new data based upon the data retrieved from the data source.

Another conventional approach to the above-referenced problem is to employ specialized programmer tools. Specialized programmer tools tend to provide a traditional programming language or a text-based scripting language that has similarities with a traditional programming language. Specialized programmer tools tend to require analytical, development, and testing techniques that are employed by persons with programming knowledge.

The aforementioned conventional approaches suffer from various deficiencies. First, conventional macro recorders that generate conventional macros for an application tend not to have the ability to make complex decisions based on feedback from the application (or feedback from another application). Thus, conventional macro recorders are limited to performing simple, repetitive tasks that function in an identical manner each time the tasks are performed. If anything changes in the application version or user interface, the conventional macro becomes useless and could even accidentally execute actions in error causing the user to suffer economic losses or embarrassment. Second, conventional macros tend to be tied to characteristics of the computing device on which they are recorded and hence can be challenging to port to computing devices with different characteristics. Third, specialized programmer tools are not meant to be used by users who are not programmers and thus cannot be readily used by users that lack programming knowledge.

SUMMARY

The following is a brief summary of subject matter that is described in greater detail herein. This summary is not intended to be limiting as to the scope of the claims.

A computing device presents a graphical user interface (GUI) for an automation application on a display. The GUI for the automation application displays a directed graph representing a macro for a target application. The directed graph comprises nodes and directed edges connecting the nodes, wherein each node in the nodes is assigned to an input that is received by the target application during recording of the macro, wherein each directed edge in the directed edges is assigned criteria that are to be satisfied in order to traverse each directed edge. Responsive to receiving a modification to the directed graph, the automation application updates the GUI to display a modified directed graph based upon the modification. The automation application generates a modified macro for the target application based upon the modified directed graph.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 3A-3D are illustrations of exemplary graphical user interface (GUIs) for a target application.

FIGS. 4A-4G are illustrations of exemplary GUIs for an automation application.

DETAILED DESCRIPTION

Figure 1:
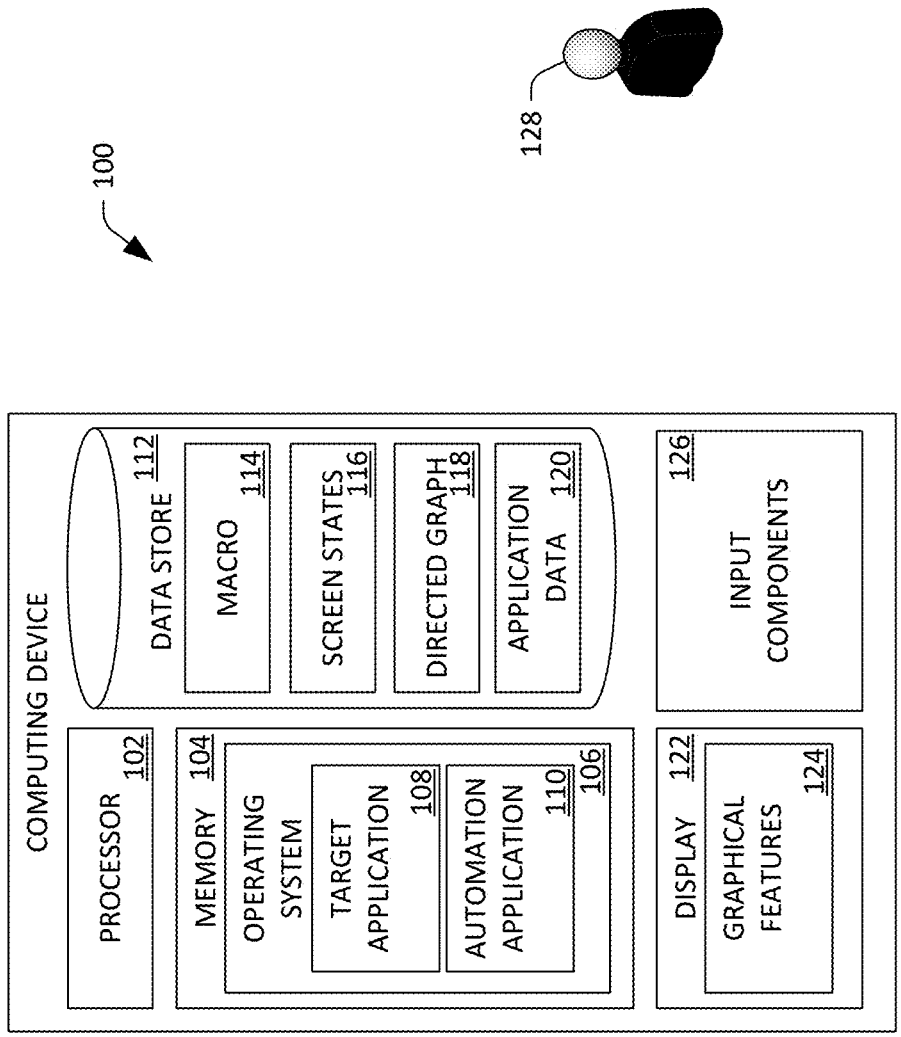
FIG. 1 is a functional block diagram of an exemplary computing device.

Various technologies pertaining to graphical user interfaces (GUIs) for macro generation, modification, and verification are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "application," and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Systems and methods are disclosed herein provide a robust macro tool for users that do not have specialized programming knowledge, but still achieve high levels of interaction and functionality to interface multiple applications, or gather or supply data to applications, even for applications without an application programming interface. As such the systems and method disclosed herein fundamentally alter the nature of programming interactions with the user interface to provide high levels of automation and functionality. In particular, these systems and methods alter the nature of programming interactions between an enterprise content management system and a line of business application (i.e., a target application) interacting through the user interface of the line of business application, including, for example, web-based business applications.

As used herein, the term "macro" refers to a series of computer-executable instructions that, when executed by a processor of a computing device, cause the computing device to mimic a sequence of inputs to the computing device.

With reference to FIG. 1, an exemplary computing device 100 is illustrated. The computing device 100 is operated by a user 128. The user 128 may lack computer-programming knowledge. In an example, the computing device 100 may be a desktop computing device, a laptop computing device, a tablet computing device, a smartphone, or a gaming console. The computing device 100 includes a processor 102 and memory 104, wherein the memory 104 has an operating system 106, a target application 108, and an automation application 110 loaded therein.

The operating system 106 (when executed by the processor 102) provides an interface between applications stored in the memory 104 (e.g., the target application 108 and the automation application 110) and hardware resources of the computing device 100. In an embodiment, the computing device 100 may execute the operating system 106 in a virtual machine environment.

The target application 108 (when executed by the processor 102) is generally configured to perform actions based in part upon input by the user 128. Alternatively, the target application 108 may perform the actions based in part upon input that is mimicked by the automation application 110. An action in the actions may include generating data, modifying data, exchanging data with another application executing on the computing device 100, transmitting data to a second computing device, receiving data from the second computing device, or combinations thereof. The action may also include causing the second computing device to generate data, modify data, transmit data, receive data, exchange data between different applications executing on the second computing device, or combinations thereof. In order to facilitate performing the actions, the target application 108 is configured to present a GUI to the user 128. In an embodiment, the target application 108 may be a web application that is presented within a browser that executes on the computing device 100.

In an embodiment, the target application 108 may be a distributed application. In the embodiment, the target application 108 performs client-side functionality, while a server application that executes on a server computing device performs server-side functionality. The target application 108 and the server application communicate with one another in order to perform actions. In an embodiment, the computing device 100 may execute the target application 108 in a virtual machine environment.

As will be described in greater detail below, the automation application 110 (when executed by the processor 102) is configured to generate macros for the target application 108. The automation application 110 is also configured to execute the macros for the target application 108 in order to cause the target application 108 to perform actions. Furthermore, the automation application 110 is configured to present a GUI that enables the user 128 to visualize sequences of inputs defined by the macros (in the form of a directed graph) and to make modifications to the macros (via the directed graph). Additionally, the automation application 110 is configured to present a GUI that enables the user 128 to verify that each input in the sequence of inputs is correctly executed and that the macro is performing its intended functionality. In an embodiment, the computing device 100 may execute the automation application 110 in a virtual machine environment.

The computing device 100 may additionally comprise a data store 112. The data store 112 may comprise a macro 114 that is generated by the automation application 110. In an embodiment, the macro 114 may be stored as an Extensible Markup Language (XML) file. The data store 112 may also comprise screen states 116 of the target application 108 that are captured by the automation application 110. The automation application 110 may utilize the screen states 116 in generating the macro 114. The data store 112 may comprise a directed graph 118 that is assigned to the macro. The macro 114, the screen states 116, and the directed graph 118 are described in greater detail below. Additionally, the data store 112 may comprise application data 120 that is generated, modified, transmitted, or received by the target application 108 when the target application 108 performs an action. Although the macro 114, the screen states 116, the directed graph 118, and the application data 120 are described as being retained in the data store 112, it is to be understood that some or all of these elements may be retained in the memory 104 as well.

The computing device 100 further includes a display 122, whereupon graphical features 124 may be presented thereon. In an example, the graphical features 124 include a GUI for the target application 108. In another example, the graphical features 124 include a GUI for the automation application 110.

The computing device 100 additionally includes input components 126 that are suitable for data input. The input components 126 may include a mouse, a keyboard, a scroll wheel, a trackpad, a touchscreen, a camera, a video camera, and/or a microphone. As such, examples of input to the computing device 100 may include, but are not limited to, a single click of a mouse button of a mouse, a double click of the mouse button, a drag and drop performed by the mouse (i.e., a depression of the mouse button of the mouse, followed by a drag of the mouse in a direction while the mouse button remains depressed, followed by a release of the mouse button), keyboard strokes captured by a keyboard, rotation of a scroll wheel, movement of a digit (e.g., a finger) of the user 128 across a trackpad or a touchscreen, a depression of the digit on the trackpad or the touchscreen, movements of the user 128 as captured by a camera or a video camera, and/or audible words uttered by the user 128 as captured by a microphone.

Operation of the computing device 100 is now set forth. It is contemplated that a GUI for the target application 108 is presented within a window shown on the display 122. The automation application 110 may receive an indication from the user 128 indicating that the automation application 110 is to begin recording a sequence of inputs (i.e., one or more inputs) received by the computing device 100 from the user 128. The automation application 110 may capture an initial screen state (described below) of the target application 108 responsive to receiving the indication.

The target application 108 may then receive a sequence of inputs from the user 128 that causes the target application 108 to perform an action (or more than one action). In an example, the target application 108 may receive a first input (e.g., a series of keystrokes corresponding to a word) from the user 128. The target application 108 may then receive a second input (e.g., a mouse-click on a button that causes the target application 108 to transmit the word to another computing device) from the user 128.

The automation application 110 also records the screen states 116 of the target application 108 as each input in the sequence of inputs is received by the target application 108. A screen state in the screen states 116 comprises a screen shot of the target application 108 when (or immediately before) the target application 108 receives an input from the user 128. The screen state may also comprise characteristics of the display 122 on which the GUI for the target application 108 is displayed. The characteristics may include a size of the display 122, a resolution of the display 122 (e.g., 1920 pixels×1080 pixels or 3840 pixels×2160 pixels), and/or an aspect ratio of the display 122 (e.g., 16:9, 16:10, or 21:9). If the target application 108 is not running in a full-screen mode, the screen state may also comprise the same display characteristics for the reduced-size display (window). The screen state may also comprise accessibility characteristics of the operating system 106, such as a font size or font type in which text is presented within the GUI for the target application 108. Font size or type can improve resilience in identifying positions and bounding boxes if these attributes differ at recording time versus execution time. In the example above, the automation application 110 may capture a first screen state of the target application 108 immediately prior to the first input being received by the target application 108 and a second screen state of the target application 108 immediately prior to the second input being received by the target application 108. The screen shot is a captured image of the visual representation of a relevant window or collection of windows that are being displayed by the target application 108. The automation application 110 records the screen shots at precise moments to be merged with the (recorded) sequence of inputs input and/or operating system processes. The screen shot is timed to provide a well-defined one-to-one correlation between the visual display (i.e., GUI) the user 128 is familiar with and the precise moment when the input should be performed. The screen shot deterministically provides a visual state of the target application 108 at the point immediately prior to the user initiated input. In an embodiment, the automation application 110 may capture transition screen states that the target application 108 displays between receiving the first input and the second input.

The automation application 110 also records positions (e.g., coordinates) at which the sequence of inputs is received by the target application 108. More specifically, the automation application 110 may record the positions with respect to the display 122 (i.e., an input was received at a pixel (or a collection of pixels) on the display 122). The automation application 110 may also record the positions with respect to the window in which the GUI for target application 108 is displayed. In the example above, the automation application 110 may record that the first input was received at a first position in the window of the target application 108 and that the second input was received at a second position in the window of the target application 108.

It is understood that some inputs received by the target application 108 may cause a child window (or several child windows) to be presented on the display 122 in addition to the window (i.e., a parent window) for the target application 108. The child window may be presented as an overlay to the parent window for the target application 108 or side-by-side to the parent window for the target application 108. The automation application 110 may determine a position of the child window on the display 122. The automation application 110 may also determine the position of the child window relative to a position of the parent window on the display 122.

The automation application 110 also records operating system processes that are performed by the operating system 106 as the target application 108 receives each input in the sequence of inputs from the user 128. For example, the operating system processes may include operating system hook functions (i.e., operating system functions that intercept events that occur within the target application 108), operating system message events (i.e., messages passed by the operating system 106 to a window of the target application 108 as the target application 108 receives the sequence of inputs), operating system automation processes, multiple document interface (MDI) child window activations, and/or command line emulation protocol responses.

The operating system processes may also include keystroke events intercepted (i.e., hooked) by the operating system 106, mouse events intercepted by the operating system 106, output methods contained in shared libraries (e.g., Dynamic-link libraries (DLLs)) that are used to write output to a display and that are intercepted by the operating system 106, such as text output routines, drawing routines, and positioning routines such as bit block transfer (BitBlt) operations, appearance of windows of the target application 108 that are intercepted by the operating system 106, message streams of the target application 108 that are intercepted by the operating system 106, and/or callback mechanisms for terminal emulation or third party libraries that are intercepted by the operating system 106.

In an embodiment, the automation application 110 may record the sequence of inputs, the screen states, and the operating system processes using Transmission Control Protocol (TCP)/Internet Protocol (IP) socket communications, named pipes, shared memory, persistently stored file logs, and/or direct method calls and event callbacks linked to the automation application 110.

The automation application 110 may also record evidence events that represent information obtained from the operating system processes. The evidence events may also be performed by the target application 108 and may provide feedback to the user 128. For instance, the evidence events may include text being written to a GUI of the target application 108 (or another application), device context content being copied to a different device context, activation (i.e., opening) of a window by the operating system 106, deactivation (i.e., closing) of a window of the operating system 106, positioning data indicating a change of position of an element (e.g., a control) of the GUI of the target application 108, text representing an internal name of an element of the GUI of the target application 108, text, names, positioning, and type information of operating system interface controls being presented to the user 128, text available from an emulation protocol response, and/or a second application being executed by the computing device 100. The evidence events may include information that is visible or invisible to the user 128 and may occupy distinct or co-incident coordinates on the display 122. The evidence events (that may originate from multiple distinct operating system processes) may be collected and merged into a stream of evidence events (without requiring the user 128 to have knowledge of the origin of each evidence event). An evidence event in the evidence events may include multiple properties that are associated with the evidence event. For instance, an evidence event corresponding to representing text written to the display 122 may include the text, a bounding box of the text, and a window within which the text was written.

The automation application 110 records each input in the sequence of inputs as each input is received by the target application 108. The automation application 110 may record a timestamp when each input is received by the target application 108. For instance, when an input in the sequence of inputs is received by the target application 108, the automation application 110 may record a timestamp and assign the timestamp to the input, a screen state of the target application 108 when the target application 108 receives the input, operating system processes performed by the operating system 106 when the target application 108 receives the input, and evidence events occurring when the target application 108 receives the input. The automation application 110 may utilize the timestamps in generating the macro 114. In the example above, the automation application 110 may record a first timestamp when the first input is received by the target application 108 and a second timestamp when the second input is received by the target application 108. The automation application 110 may assign the first timestamp to the first input (and its corresponding screen state, operating system processes, and evidence events) and the second timestamp to the second input (and its corresponding screen state, operating system processes, and evidence events). It is to be understood that the operating system processes may be performed in a manner such that an order in which the evidence events come into existence may not correspond to the order in which the operating system processes are performed. Thus, the automation application 110 may utilize the first timestamp and the second timestamp in order to ensure that the macro (when generated) performs actions in the correct order. Additionally, the automation application 110 may also use the first timestamp and the second timestamp to resolve conflicting evidence events on a GUI for the target application 108.

In an embodiment, the automation application 110 may receive a first indication from the user 128 that macro recording is to be paused. Responsive to receiving the first indication, the automation application 110 may pause recording of the macro (i.e., the automation application 110 temporarily ceases recording inputs, screen states, operating system processes, and evidence events). When the user 128 wishes to resume recording of the macro, the automation application 110 may receive a second indication from the user 128 that macro recording is to resume. Responsive to receiving the second indication, the automation application 110 may resume recording the macro.

When the user 128 wishes to end recording of the macro, the automation application 110 may receive an indication from the user 128 that the automation application 110 is to cease recording of the macro (i.e., the automation application 110 is to cease recording inputs, screen states, operating system processes, and evidence events). The automation application 110 may capture a screen state of the target application 108 responsive to receiving the indication.

The automation application 110 may then generate the macro based upon each input in the sequence of inputs received by the target application 108, the screen states of the target application 108 as the target application 108 received each input in the sequence of inputs, the operating system processes performed by the operating system 106 as the target application 108 received each input in the sequence of inputs, and the evidence events. More specifically, the automation application 110 may generate the macro concurrently with or subsequent to recording the sequence of inputs, the screen states, the operating system processes, and the evidence events. More specifically, the automation application 110 may generate a series of computer-executable instructions that, when executed by the automation application 110, cause the automation application 110 to mimic the sequence of inputs to the target application 108 without manual input of the user 128. The macro includes criteria upon which the automation application 110 mimics the sequence of inputs. The criteria include prior input in the sequence of inputs being mimicked in the correct order, screen states of the target application 108 as the target application 108 receives mimicked input from the automation application 110, operating system processes performed by the operating system 106 when the target application 108 receives the mimicked input from the automation application 110, and evidence events representing information obtained from the operating system 106 when the target application 108 receives the mimicked input from the automation application 110.

The automation application 110 may generate the directed graph 118 based upon the sequence of inputs received by the target application 108, the screen states of the target application 108 as the target application 108 received the sequence of inputs, and operating system processes performed by the operating system 106 as the target application 108 received the input. The automation application 110 may also generate the directed graph based upon the evidence events described above. The automation application 110 may then generate the macro based upon the directed graph 118. It is to be understood that the directed graph 118 (or portions thereof), the screen states 116 (or portions thereof), indications of the operating system processes (or portions thereof), and indications of the evidence events (or portions thereof) may be included in the macro.

The directed graph 118 comprises nodes and directed edges that connect the nodes. Each node in the nodes is assigned to an input in the sequence of inputs received by the target application 118. Notably, when the automation application 110 executes the macro, the automation application 110 mimics at least some of the inputs assigned to the nodes. The automation application 110 may assign each directed edge criteria that are to be satisfied in order for the automation application 110 to traverse each directed edge. It is to be understood that some directed edges may not be assigned criteria (i.e., the criteria is empty). Moreover, it is also to be understood that the criteria need not be mutually exclusive. The criteria are based upon the sequence of inputs, the screen states 116 of the target application 108 as the target application 108 receives the sequence of inputs, operating system processes that are performed by the operating system 106 as the target application 108 receives the sequence of inputs, and evidence events representing information obtained by the operating system processes. For instance, the criteria may include evaluating text located in a screen state against a constant text value, evaluating a position of the text in the screen state against a constant set of coordinates in the screen state, evaluating the position of the text in the screen state against a variable set of coordinates in the screen state, evaluating the text in the screen state against a data element (i.e., data passed into the macro or data originated from a prior screen state), evaluating the text in the screen state against an expression, evaluating the text in the screen state against second text in a prior screen state, and/or evaluating the text in the screen state against second text located in the screen state.

It is to be understood that an expression included in the criteria may combine or transform data shown by the target application 108 in order to replicate a decision that the user 128 would normally make. In an example, the target application 108 may display a date of birth of an individual; however, the user 128 requires an age of the individual to make the decision. Thus, the expression may transform the date of birth of the individual to an age, and the automation application 110 may utilize the age in order to determine which directed edge to traverse (and hence, which input to mimic next) in the directed graph 118.

The automation application 110 may store the macro in the data store 112 (e.g., as the macro 114). Additionally, or alternatively, the automation application 110 may also cause the macro to be transmitted over a network to a second computing device (not shown), whereupon the second computing device may store the macro in a data store.

Subsequent to generating the macro, the automation application 110 may execute the macro. In an example, the automation application 110 may execute the macro responsive to receiving an indication from the user 128. In another example, the automation application 110 may automatically execute the macro at a predefined time interval (e.g., once a day, once an hour). In yet another example, the automation application 110 may execute the macro responsive to receiving a request from another application executing on the computing device 100 or executing on another computing device. The automation application 110 may execute the macro as a result of being instructed to do so by another application. Prior to or concurrently with executing the macro, the automation application 110 determines characteristics of the display 122 and accessibility characteristics of the operating system 106 in order to ensure that the macro is correctly executed. More specifically, the automation application 110 compares the characteristics of the display 122 and the accessibility characteristics of the operating system 106 with the criteria included in the macro. When the automation application 110 determines that differences exist between the criteria in the macro and the characteristics of the display 122 and/or the operating system 106 (e.g., the target application 108 has been updated to a different version subsequent to generating the macro or the computing device 100 has been configured with a new display that has different characteristics than the display 122), the automation application 110 may adjust execution of the macro such that the macro performs its intended action despite the differences. For instance, the automation application 110 may adjust positions at which the sequence of inputs is received by the target application 108 in a window of the target application 108 based upon the characteristic of the display 122 and/or the characteristics of the operating system 106. The automation application 110 may also adjust the position and extent of evidence events and operating system processes based upon the differences in characteristics of the display 122.

Executing the macro causes the automation application 110 to mimic the sequence of inputs to the target application 108, thereby causing the target application 108 to perform an action (or more than one action). The automation application 110 may execute the macro in part by traversing the directed graph. The automation application 110 mimics each input in the sequence of inputs to the target application 108 as reflected by nodes (in the first subset) that are connected by directed edges in the directed graph 118. As the automation application 110 mimics each input in the sequence of inputs, the automation application 110 monitors for screen states, operating system processes, and evidence events specified in the macro in order to proceed to mimic subsequent inputs in the sequence of inputs. In the example above, the automation application 110 may mimic the first input to the target application 108. The automation application 110 may then determine whether the criteria assigned to the directed edge connecting the first node to the second node are satisfied. The automation application 110 mimics the second input to the target application 108 when the automation application 110 determines that the criteria are satisfied. For instance, the automation application 110 may mimic the second input to the target application 108 upon determining: that the first input has been received by the target application 108, that the target application 108 is presenting certain screen states on the display 122, that certain operating system processes have performed by the operating system 106, and/or that the automation application 110 has detected that certain evidence events have occurred. Thus, the automation application 110 traverses the directed graph 118 in order to execute the macro.

Although the above-described process has been described as generating a single macro (i.e., the macro 114) for a single application (i.e., the target application 108), it is to be understood that the automation application 110 may generate many different macros for many different applications. Moreover, it is to be understood that a single macro may include instructions for actions that are performed by different applications in addition to actions performed by the target application 108. For instance, the macro may cause the target application 108 to perform an action in addition to causing a second application executing on the computing device 100 to perform a second action. Such, as for example, the macro can direct the operating system to switch windows to a second application while running the macro, and perform actions in both windows for both applications.

Figure 2:
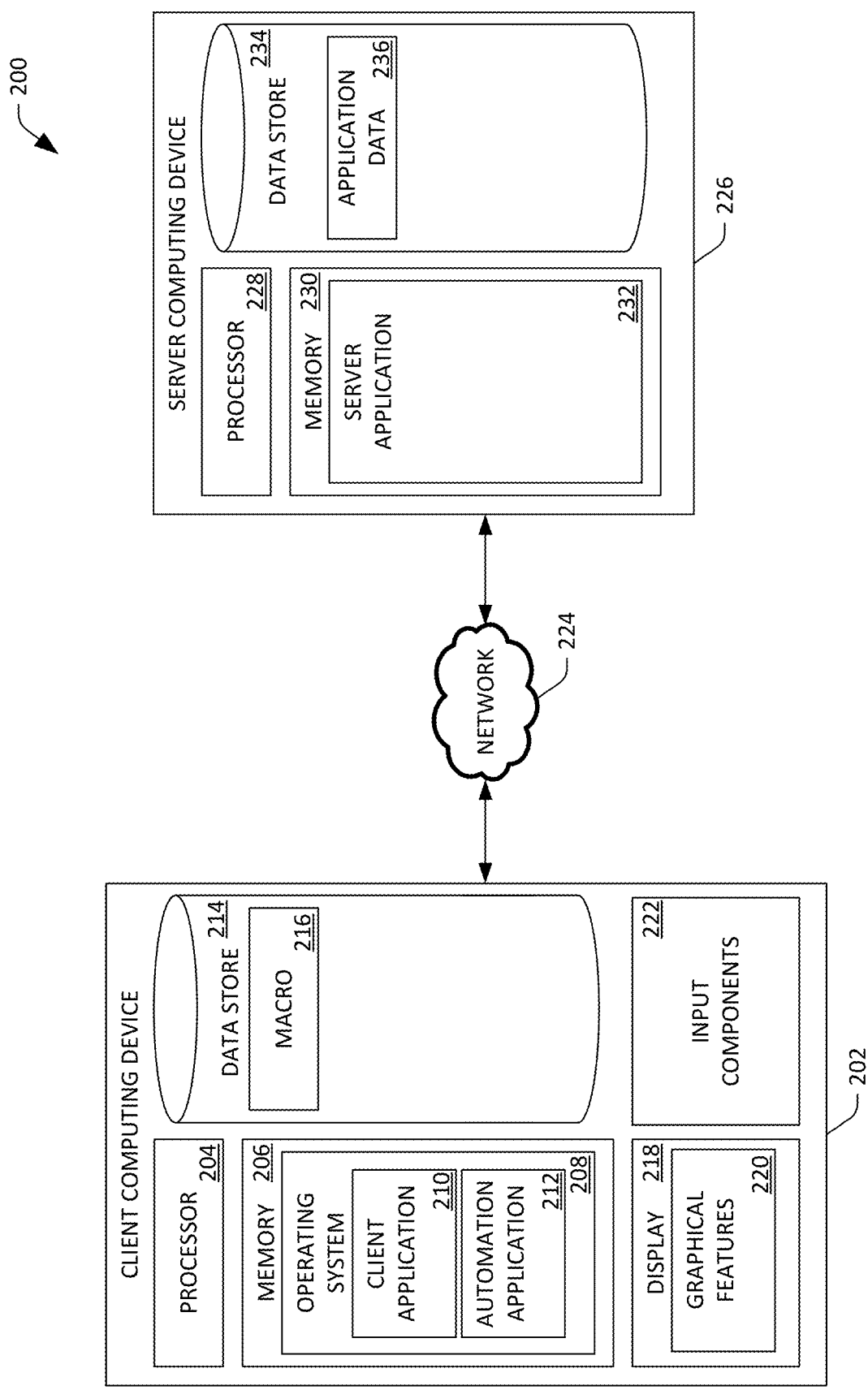
FIG. 2 is a functional block diagram of an exemplary computing system.

Referring now to FIG. 2, an exemplary computing system 200 is illustrated. The computing system 200 includes a client computing device 202. In an embodiment, the client computing device 202 may be or include the computing device 100 described above in FIG. 1. In another embodiment, the client computing device 202 is a separate computing device from the computing device 100. The client computing device 202 may be operated by a user (e.g., the user 128 or another user).

The client computing device 202 comprises a processor 204 and memory 206, wherein the memory 206 has an operating system 208, a client application 210, and an automation application 212 loaded therein. The operating system 208 (when executed by the processor 204) provides an interface between applications stored in the memory 206 (e.g., the client application 210 and the automation application 212) and hardware resources of the client computing device 202. In an embodiment, the client computing device 202 may execute the operating system 208 in a virtual machine environment.

The client application 210 (when executed by the processor 204) is generally configured to perform actions. The client application 210 may be similar or identical to the target application 108 described above. The automation application 212 may be similar or identical to the automation application 110 described above.

The client computing device 202 may additionally comprise a data store 214. The data store 214 stores a macro 216 that has been generated by the automation application 212 (or another automation application, such as the automation application 110). As described above in the description of FIG. 1, the macro 216 has been generated based upon a sequence of inputs from a user received by the client application 210 (or the target application 108), screen states of the client application 210 (or the target application 108) as the client application 210 (or the target application 108) receives the sequence of inputs, operating system processes performed by the operating system 208 (or the operating system 106) as the client application 210 (or the target application 108) receives the sequence of inputs, and evidence events representing information obtained from the operating system processes. It is to be understood that the macro 216 may also be retained in the memory 206. In an example, the macro 216 may be or include the macro 114 described above. Although not depicted in FIG. 2, the data store 214 may also comprise screen states, directed graphs, and application data similar to that described above in the description of FIG. 1.

The client computing device 202 additionally includes a display 218, whereupon graphical features 220 may be presented thereon. For example, a GUI for the client application 210 and/or a GUI for the automation application 212 may be presented as part of the graphical features 220. The client computing device 202 also includes input components 222. The input components 222 may be similar to identical to the input components 126 described above.

The computing system 200 also includes a server computing device 226. The server computing device 226 is in communication with the client computing device 202 by way of a network 224 (e.g., the Internet, intranet). The server computing device 226 comprises a processor 228 and memory 230, wherein the memory 230 has a server application 232 loaded therein. The server application 232 is generally configured to communicate with the client application 210 in order to perform actions. In an embodiment, the server application 232 may lack a publicly accessible API.

In an embodiment, the client application 210 may be a client Enterprise Content Management (ECM) application and the server application 232 may be a server ECM application (collectively, "the ECM system"). An ECM system may be generally configured to capture, manage, store, preserve, and deliver content and documents related to organizational processes within an organization. The ECM system may be configured with functionality pertaining to document management, web content management, search, collaboration, image management, records management, digital asset management, workflow management, and capture and scanning. The ECM system may provide functionality that enables management of unstructured, semi-structured, and/or structured information. The ECM system may be installed on a network of the organization, may be provided as a software as a service (SaaS) offering, or may be provided as an Infrastructure as a Service (IaaS) offering (i.e., cloud computing).

The ECM system may provide functionality pertaining to web content management, collaborative content management, and/or transactional content management. Web content includes information or documents that reside on internet or cloud-based servers. Web content management includes managements of websites and databases. Web content management also includes enabling content producers to create and publish content (e.g., articles, photo galleries). Web content management also provides for dynamic uploading and editing of the content.

Collaborative content management includes managing documents or content that multiple users have or need to access. Collaborative content management enables documents to be accessed and edited by multiple users simultaneously. For instance, a team of users can work upon a single master document tracking changes, saving minor drafts, and embedding files.

Transactional content management includes functionality pertaining to collection of physical documents that may be transformed into electronic, magnetic, or optically-stored documents. For instance, transactional content management may include managing insurance claims, medical records, government forms, payroll, student admissions, etc. Transactional content management provides an efficient way to maintain and access documents and may provide for efficient integration with many different applications.

In another embodiment, the client application 210 may be a client electronic health records application (EHR) and the server application 232 may be a server EHR (collectively, "the EHR"). The EHR is configured to assist healthcare workers with providing care to patients. EHRs are configured with functionality pertaining to patient intake, patient billing, insurance billing, prescription generation, maintaining a record of patient care over time, etc. EHRs are often used by healthcare workers at the point of care (i.e., at a time when the healthcare worker is providing care to a patient). For example, a healthcare worker may retrieve data from a patient record maintained by an EHR to relatively quickly ascertain problems being experienced by the patient, medications currently being taken by the patient, and so forth. In the embodiment, the automation application 110 may execute a macro which causes the server EHR to perform an action with respect to the patient record. In an embodiment, the automation application 212 can access a client application 210 and copy EHR data from the server application 232, store it, and or paste it into an additional application. Because of the various features disclosed herein, this process can be done with fewer errors and more speed than preexisting technological solutions.

The server computing device 226 may additionally comprise a data store 234. The data store 234 retains application data 236. The application data 236 may take different forms depending on the function of the server application 232. When the server application 232 is a server EHR, the application data 236 may be patient records for patients. When the server application 232 is an ECM system, the application data 236 may comprise documents, records, images, etc.

In an embodiment, the application data 236 may be organized in a database. For instance, the database may be a relational database (e.g., a database that stores the application data 236 in tabular schema of rows and columns) or a nonrelational database (i.e., a database that stores the application data 236 in a format other than rows and columns, such as a database that stores the application data 236 as a key/value pair, as a JavaScript Object Notation (JSON) document, or as a graph).

Although not shown in FIG. 2, it is to be understood that some of the functionality of the automation application 212 may be implemented on a server automation application (not shown) that executes on the server computing device 226.

Operation of the computing system 200 is now set forth. The automation application 212 may generate the macro 216 using a similar or identical process to that described above in the description of FIG. 1. Alternatively, the client computing device 202 may receive the macro 216 from another computing device (e.g., the computing device 100). The automation application 212 then executes the macro 216. In an example, the automation application 212 may execute the macro responsive to receiving input from a user of the client computing device 202. In another example, the automation application 212 may execute the macro at a predefined time interval (e.g., once a day, once an hour).

Similar to the process described above in the description of FIG. 1, executing the macro causes the automation application 212 to mimic the sequence of inputs to the client application 210, thereby causing the client application 210 to perform an action (or more than one action). For instance, the sequence of inputs defined by the macro may cause the client application 210 to generate a query and to transmit the query to the server application 232. The server application 232 may then execute the query against the application data 236 in order to retrieve a subset of the application data 236. The server application 232 then transmits the subset of the application data 236 to the client application 210 (or to another application executing on another computing device).

Prior to or concurrently with executing macro 216, the automation application 212 determines characteristics of the display 218 and accessibility characteristics of the operating system 208. For instance, the automation application 212 may determine a size of the display 218, a resolution of the display 218, an aspect ratio of the display 218, and a font size or a font type in which text is to be presented within a GUI for the client application 210. The automation application 212 may then translate positions of inputs in the sequence of inputs as defined in the macro to second positions with respect to the display 218. For example, if a first input in the sequence of inputs occurred at a first position on the display 122 of the computing device 100, but the display 218 has a different size, resolution, and/or aspect ratio, the automation application 212 may translate the first position to a corresponding second position on the display 218 of the client computing device 202. The automation application 212 may then mimic the first input to the client application 210 at the second position on the display 218.

In an embodiment, the automation application 110 and/or the automation application 212 may be configured with an API. As such, a second application (not shown) may perform a programmatic call using the API in order to cause the automation application 212 to execute the macro.

FIGS. 3A-3D and 4A-4G depict exemplary GUIs that illustrate operation of the automation application 110 when generating and modifying a macro for the target application 108. FIGS. 3A-3D generally show actions occurring on an exemplary GUI 300 associated with an exemplary target application 108. In this case, the target application 108 is a database load, entry and validation application. FIGS. 4A-4G show actions occurring on a GUI 400 associated with an exemplary automation application 110. These sets of Figures will be referred to in non-consecutive order, because actions happen in FIGS. 3A-3D that are associated with actions in the GUI 400 of FIGS. 4A-4G. In an embodiment, the target application 108 and the automation application 110 are running concurrently, and the GUIs 300, 400 associated with the target and automation application 108, 110, respectively may be displayed one at a time on a single display or concurrently on dual displays or separate windows on the same display.

The following three paragraphs provide a general summary that will be described in greater detail below. The automation application 110 presents a GUI for the automation application 110 on the display 122. The GUI displays a directed graph representing a macro generated by the automation application 110. The directed graph comprises nodes and directed edges. Each node in the nodes is assigned to an input received by the target application 108 during recording of the macro. Each directed edge in the directed edges is assigned criteria that are to be satisfied in order to traverse each directed edge. Responsive to receiving a modification to the directed graph, the automation application 110 updates the GUI to display a modified directed graph based upon the modification. The modification to the directed graph may include additions of nodes, deletions of nodes, additions of directed edges, deletions of directed edges, changing origin nodes of directed edges, and/or changing termination nodes of directed edges. The modification to the directed graph may also include adding, deleting, or changing criteria assigned to directed nodes in the directed graph. The modification to the directed graph may be received directly from the user 128 via the GUI. Additionally or alternatively, the modification to the directed graph may be caused by inputs received by the target application 108 when the automation application 110 is recording the macro (or another macro).

The automation application 110 generates a modified macro based upon the modified directed graph. The automation application 110 may generate the modified macro after the directed graph has been modified or concurrently with the directed graph being modified. More specifically, the automation application 110 translates modifications made to the directed graph (or modifications made to criteria assigned to directed edges in the directed graph) displayed within the GUI to a series of computer-executable instructions that are different than the series of computer-executable instructions comprised by the (unmodified macro). In an embodiment where the (unmodified) macro is stored as an XML file, the automation application 110 can modify the XML file based upon the modification to the directed graph (and hence, the modified directed graph) in order to generate the modified macro. In an example, when the automation application 110 executes the macro represented by the (unmodified) directed graph, the target application 108 performs a first action. However, when the automation application 110 executes the modified macro represented by the modified directed graph, the target application 108 performs a second action which is different than the first action.

In the examples that are to be described below, the automation application 110 receives an indication from the user 128 that the automation application 110 is to begin recording a macro for the target application 108. As such, the computing device 100 receives input from the user 128 that causes the computing device 100 to open the target application 108. Alternatively, the target application 108 may already be executing on the computing device 100 when the automation application 110 receives the indication that the automation application 110 is to begin recording the macro. The automation application 110 may capture screen states, operating system processes, and evidence events when the indication is received (which may later be incorporated into criteria for directed edges in a directed graph representing the macro).

With reference now to FIG. 3A, a GUI 300 for the target application 108 (also referred to herein as "the first GUI 300") is illustrated. The target application 108 presents the first GUI 300 on the display 122 as part of the graphical features 124 while the automation application 110 is recording the macro or prior to the automation application 110 beginning to record the macro. The first GUI 300 comprises a full name field 302, an address field 304, and a license number field 306. The first GUI 300 further comprises a load record button 308 and a print record button 310. Additionally, the first GUI 300 comprises a cursor 312 (e.g., a mouse cursor).

The target application 108 receives a first input from the user 128 that causes the load record button 308 to be selected while the cursor 312 is placed over the load record button 308 in the first GUI 300. As described above, the automation application 110 records the first input (including coordinates on the first GUI 300 at which the first input is received by the target application 108), a timestamp when the first input is received by the target application 108, a screen state of the target application 108 when the target application 108 receives the first input, operating system processes performed by the operating system 106 when the target application 108 receives the first input, and evidence events occurring when the target application 108 receives the first input.

With reference now to FIG. 3B, an updated view of the first GUI 300 is illustrated. Responsive to receiving the selection of the load record button 308 (i.e., the first input), the target application 108 causes the full name field 302, the address field 304, and the license number field 306 to be populated with data from a record. For instance, as shown in FIG. 3B, the full name field 302 is populated with "Joe Smith," the address field 304 is populated with "123 1$^{st}$ Street Happy Town, Ohio 44444," and the license number field 306 is populated with "12345." Furthermore, responsive to receiving the selection of the load record button 308, the target application 108 also causes a validate record button 314 to be presented within the first GUI 300.

In an example, the target application 108 receives a second input from the user 128 that causes the validate record button 314 to be selected while the cursor 312 is placed over the validate record button 314. The automation application 110 records the second input (including coordinates on the first GUI 300 at which the second input is received by the target application 108), a timestamp when the second input is received by the target application 108, a screen state of the target application 108 when the target application 108 receives the second input, operating system processes performed by the operating system 106 when the target application 108 receives the second input, and evidence events occurring when the target application 108 receives the second input. Subsequently, the automation application 110 receives an indication from the user 128 that recording of the macro is to cease. The automation application 110 then generates the macro. Alternatively, the automation application 110 generates the macro concurrently with the first input and the second input being received by the target application 108.

Figure 4A:
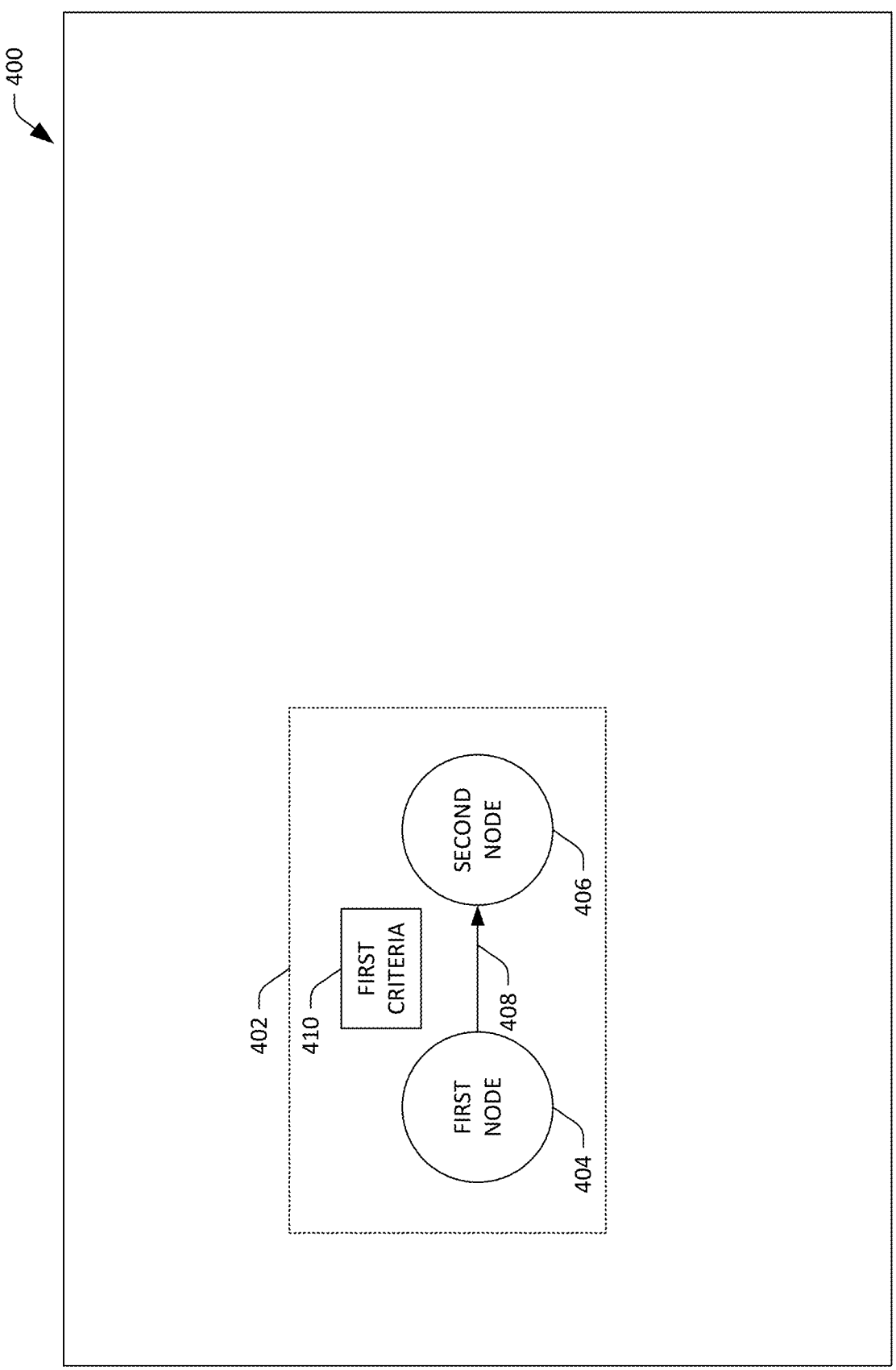

Referring now to FIG. 4A, a GUI 400 for the automation application 110 (also referred to herein as "the second GUI 400") is illustrated. The automation application 110 may present the second GUI 400 on the display 122 subsequent to the automation application 110 receiving the indication that recording of the macro is to cease. Alternatively, the automation application 110 may present the second GUI 400 on the display 122 as the macro is recorded. In an embodiment, the computing device 100 may present the first GUI 300 and the second GUI 400 concurrently on the display 122. For instance, the computing device 100 may present the second GUI 400 as a visual overlay to the first GUI 300.

The second GUI 400 displays a directed graph 402 representing the macro for the target application 108. The directed graph 402 may be a visual representation of the directed graph 118 discussed above. The directed graph 402 comprises a first node 404 assigned to the first input (described above in the description of FIG. 3A) and a second node 406 assigned to the second input (described above in the description of FIG. 3B). The directed graph 402 further comprises a first directed edge 408 that originates from the first node 404 and terminates into the second node 406. The first directed edge 408 is assigned first criteria 410 (also displayed within the second GUI 400) that are to be satisfied in order to traverse the first directed edge 408. More specifically, in the macro represented by the directed graph 402, the first criteria 410 are to be satisfied in order for the automation application 110 to mimic the second input to the target application 108 (subsequent to mimicking the first input to the target application 108) when executing the macro. As such, at minimum, the first criteria 410 comprise the automation application 110 mimicking the first input to the target application 108. The first criteria 410 may also be based upon screen states, operating system processes, and evidence events (described above). For instance, in the example described above in the description of FIGS. 3A and 3B, the first criteria 410 may include the validate record button 314 being displayed within the first GUI 300. Moreover, it is to be understood that the automation application 110 may receive criteria as input from the user 128 (i.e., user-defined criteria) and that the automation application 110 may cause the user-defined criteria to be assigned to the first directed edge 408 (i.e., the user-defined criteria are included in the first criteria 410). For instance, the user-defined criteria may be ensuring that each of the full name field 302, the address field 304, and the license number field 306 are populated with data (i.e., ensuring that the fields 302-306 are not empty).

In an embodiment, the first node 404 and the second node 406 may be selectable within the second GUI 400. For instance, when the automation application 110 receives a selection of the first node 404 by the user 128, the automation application 110 can cause a screen shot of the target application 108 to be presented on the display 122, wherein the screen shot is a screen shot of the first GUI 300 when the target application 108 receives the first input from the user 128. Alternatively, the screen shot may be a screen shot of the first GUI 300 immediately after the target application 108 receives the first input from the user 128. The automation application 110 may also update the second GUI 400 to display a table that includes names, types, and values of data shown in the screen shot when the automation application 110 receives the selection of the first node 404 by the user 128.

In an embodiment, the automation application 110 may label the first node 404 with a first label and the second node 406 with a second label and the automation application 110 may update the second GUI 400 to display the first label and the second label. The first label identifies the first input and the second label identifies the second input. For instance, in the example described above, the first label may be "Click Load Record Button" and the second label may be "Click Validate Record Button." The first label and the second label enable easy identification of inputs in the macro represented by the directed graph 402, thus facilitating modification of the macro.

Subsequent to the automation application 110 recording and generating the macro represented by the directed graph 402, it is contemplated that the user 128 wishes to modify the macro. As such, the automation application 110 may receive input from the user 128 indicating that the automation application 110 is to resume recording of the macro. Responsive to receiving the indication, the automation application 110 may resume recording the macro. The automation application 110 may capture screen states, operating system processes, and evidence events when resuming recording the macro (which may later be incorporated into criteria for directed edges in the directed graph 402).

Figure 3C:
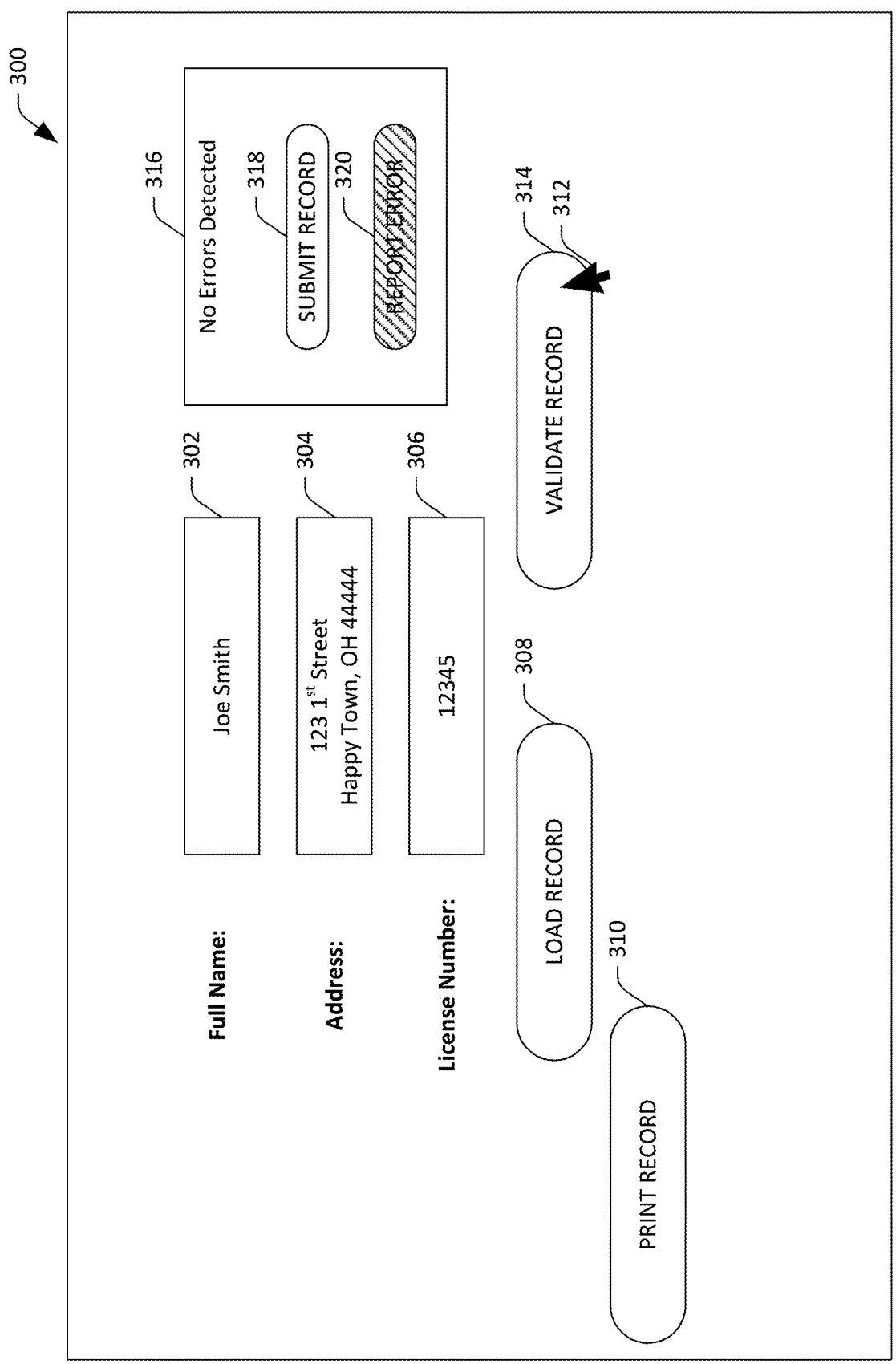

Turning now to FIG. 3C, the first GUI 300 of the target application 108 after the target application 108 has received the selection of the validate record button 314 is illustrated. The first GUI 300 now additionally includes an error window 316, wherein the error window 316 indicates whether errors were detected with respect to data in the fields 302-306. The error window 316 includes a submit record button 318 and a report error button 320. As the error window 316 indicates that no errors were detected with respect to the data in the fields 302-306, the submit record button 318 is selectable within the first GUI 300, but the report error button 320 is not selectable (indicated by diagonal lines in FIG. 3C) within the first GUI 300.

The target application 108 receives a third input from the user 128 that causes the submit record button 318 to be selected while the cursor 312 is positioned over the submit record button 318. As described above, the automation application 110 records the third input (including coordinates on the first GUI 300 at which the third input is received by the target application 108), a timestamp when the third input is received by the target application 108, a screen state of the target application 108 when the target application 108 receives the third input, operating system processes performed by the operating system 106 when the target application 108 receives the third input, and evidence events occurring when the target application 108 receives the third input.

Figure 4B:
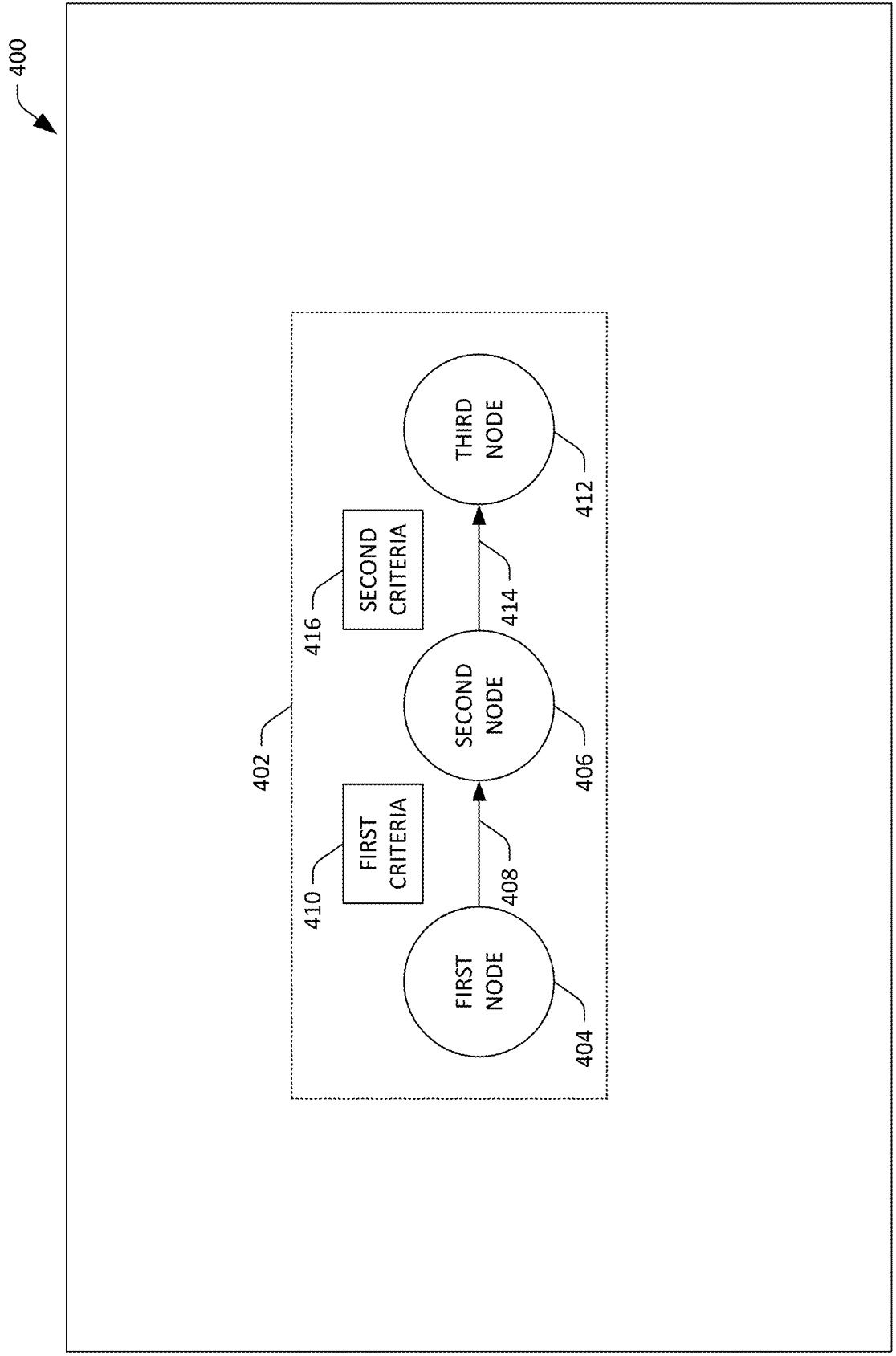

The automation application 110 modifies the directed graph 402 shown in FIG. 4A based upon the third input to generate a modified directed graph, and updates the second GUI 400 to display the modified directed graph. Turning now to FIG. 4B, an updated view of the second GUI 400 is illustrated. The automation application 110 has modified the directed graph 402 to further include a third node 412 that is assigned to the third input (i.e., the selection of the submit record button 318). The automation application 110 has further modified the directed graph 402 to include a second directed edge 414 that originates from the second node 406 and terminates into the third node 412. The second directed edge 414 is assigned second criteria 416 that are to be satisfied in order for the automation application 110 to mimic the third input to the target application 108 (subsequent to mimicking the second input to the target application 108). The automation application 110 may generate a modified macro based upon the directed graph 402 shown in FIG. 4B.

Although the third node 412 has been described as being added to directed graph 402 by way of recording, the automation application 110 enables creation of nodes and directed edges to the directed graph 402 by other means. For instance, the automation application 110 may enable the user 128 to manually add the third input to the macro represented by the directed graph 402. In an example, the automation application 110 may receive a type of the third input (e.g., a mouse click) and coordinates within the first GUI 300 at which the third input is to be received by the target application 108. The automation application 110 may then generate the third node 412 based upon the type of the third input and the coordinates. The automation application 110 may receive further input from the user 128 which causes the second directed edge 414 (as well as the second criteria 416) to be added to the directed graph 402.

The automation application 110 may also generate macros that include conditional branching functionality. For instance, at the first GUI 300 depicted in FIG. 3B, the target application 108 may receive input from the user 128 that causes the data in the license number field 306 to be replaced with invalid characters for a license number (e.g., non-numeric characters). The target application 108 may then receive a selection of the validate record button 314 similar to the process described above in the description of FIG. 3B.

Figure 3D:
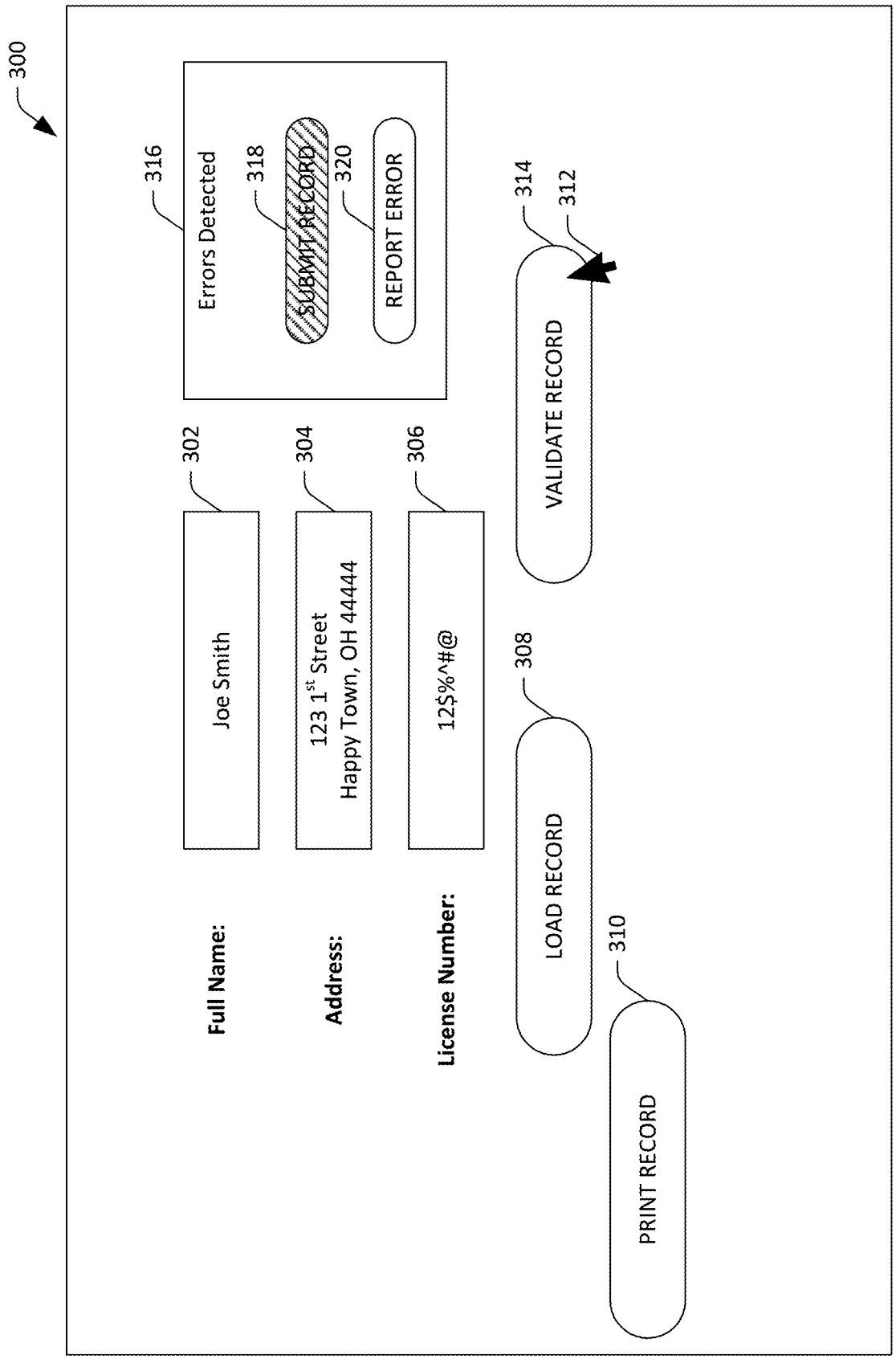

Responsive to receiving the selection of the validate record button 314, the target application 108 updates the first GUI 300 to a view shown in FIG. 3D. As the license number field 306 contains invalid characters, the error window 316 now indicates that errors were detected with respect to data in the fields 302-306. As such, the submit record button 318 is not selectable (indicated by diagonal lines in FIG. 3D) within the first GUI 300; however, unlike FIG. 3C, the report error button 320 is now selectable within the first GUI 300.

Thus, FIGS. 3C and 3D depict alternate states of the first GUI 300. When no errors are detected with respect to data in the fields 302-306, the first GUI 300 is in the state shown in FIG. 3C, but when errors are detected with respect to data in the fields 302-306, the first GUI 300 is in the state shown in FIG. 3D.

The automation application 110 may then receive an indication from the user 128 that recording of the macro is to resume. Additionally, the indication may include an identity of a node in the nodes (e.g., the second node 406) at which the macro is to resume recording. Responsive to receiving the indication, the automation application 110 resumes recording the macro. The automation application 110 may capture screen states, operating system processes, and evidence events when resuming recording the macro (which may later be incorporated into criteria for directed edges in the directed graph 402). Subsequently, the target application 108 receives a fourth input from the user 128 that causes the report error button 320 to be selected while the cursor 312 is placed over the report error button 320 within the first GUI 300. As described above, the automation application 110 records the fourth input (including coordinates on the first GUI 300 at which the fourth input is received by the target application 108), a timestamp when the fourth input is received by the target application 108, a screen state of the target application 108 when the target application 108 receives the fourth input, operating system processes performed by the operating system 106 when the target application 108 receives the fourth input, and evidence events occurring when the target application 108 receives the fourth input.

Figure 4C:
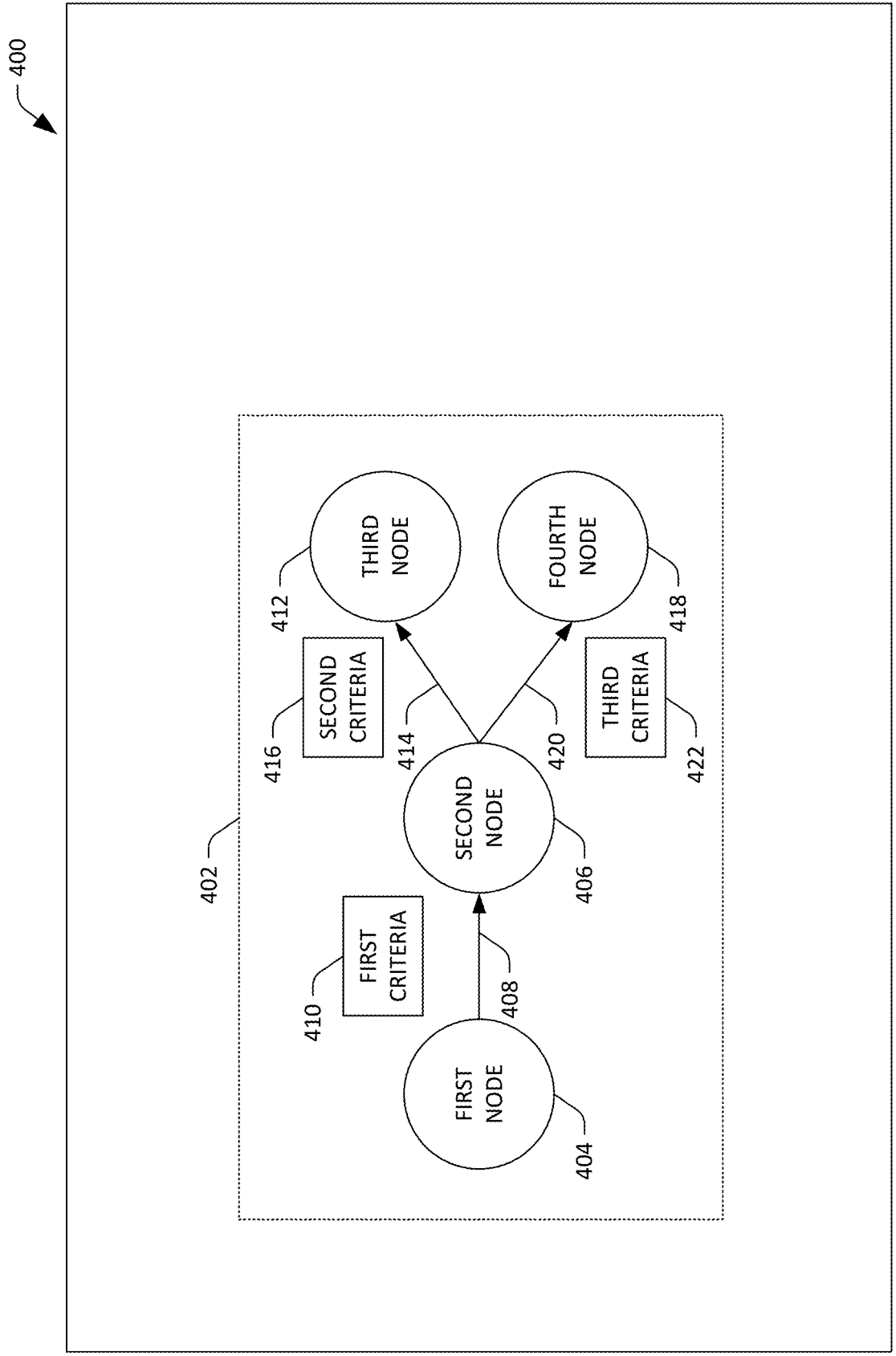

The automation application 110 modifies the directed graph 402 shown in FIG. 4B based upon the fourth input to generate a modified directed graph, and updates the second GUI 400 to display the modified directed graph. Turning now to FIG. 4C, an updated view of the second GUI 400 is illustrated. The automation application 110 has modified the directed graph 402 to include a fourth node 418 that is assigned to the fourth input. The automation application 110 has further modified the directed graph 402 to include a third directed edge 420 that originates from the second node 406 and terminates into the fourth node 418. The third directed edge 420 is assigned third criteria 422 that are to be satisfied in order for the automation application 110 to mimic the fourth input to the target application 108 (subsequent to mimicking the second input to the target application 108). The automation application 110 may generate a modified macro based upon the directed graph 402 shown in FIG. 4C.

After recording of the macro has ceased, the automation application 110 may receive input from the user 128 that causes the second criteria 416 and the third criteria 422 to be updated. For instance, the automation application 110 may update the second criteria 416 and the third criteria 422 to include an expression defined by the user 128, wherein the expression takes data in the error window 316 as input and outputs an indication as to whether or not the data indicates that errors were detected. The automation application 110 may evaluate the expression when executing the macro in order to determine which branch of the macro is to be executed (i.e., whether the automation application 110 is to mimic the third input or the fourth input to the target application 108). For instance, when the automation application 110 evaluates the expression and determines that the expression is false (i.e., the data in the error window 316 indicates that no errors were detected), the automation application 110 mimics the third input (assigned to the third node 412) to the target application 108. However, when the automation application 110 evaluates the expression and determines that the expression is true (i.e., the data in the error window 316 indicates that errors were detected), the automation application 110 mimics the fourth input (assigned to the fourth node 418) to the target application 108.

It is to be understood that criteria assigned to directed edges in the directed graph 402 need not be mutually exclusive. For instance, while the automation application 110 is recording, the target application 108 may receive a fifth input from the user 128 that causes the print record button 310 to be selected while the cursor 312 is placed over the print record button 310 within the first GUI 300. Alternatively, the fifth input may be manually specified by the user 128 (described above).

Figure 4D:
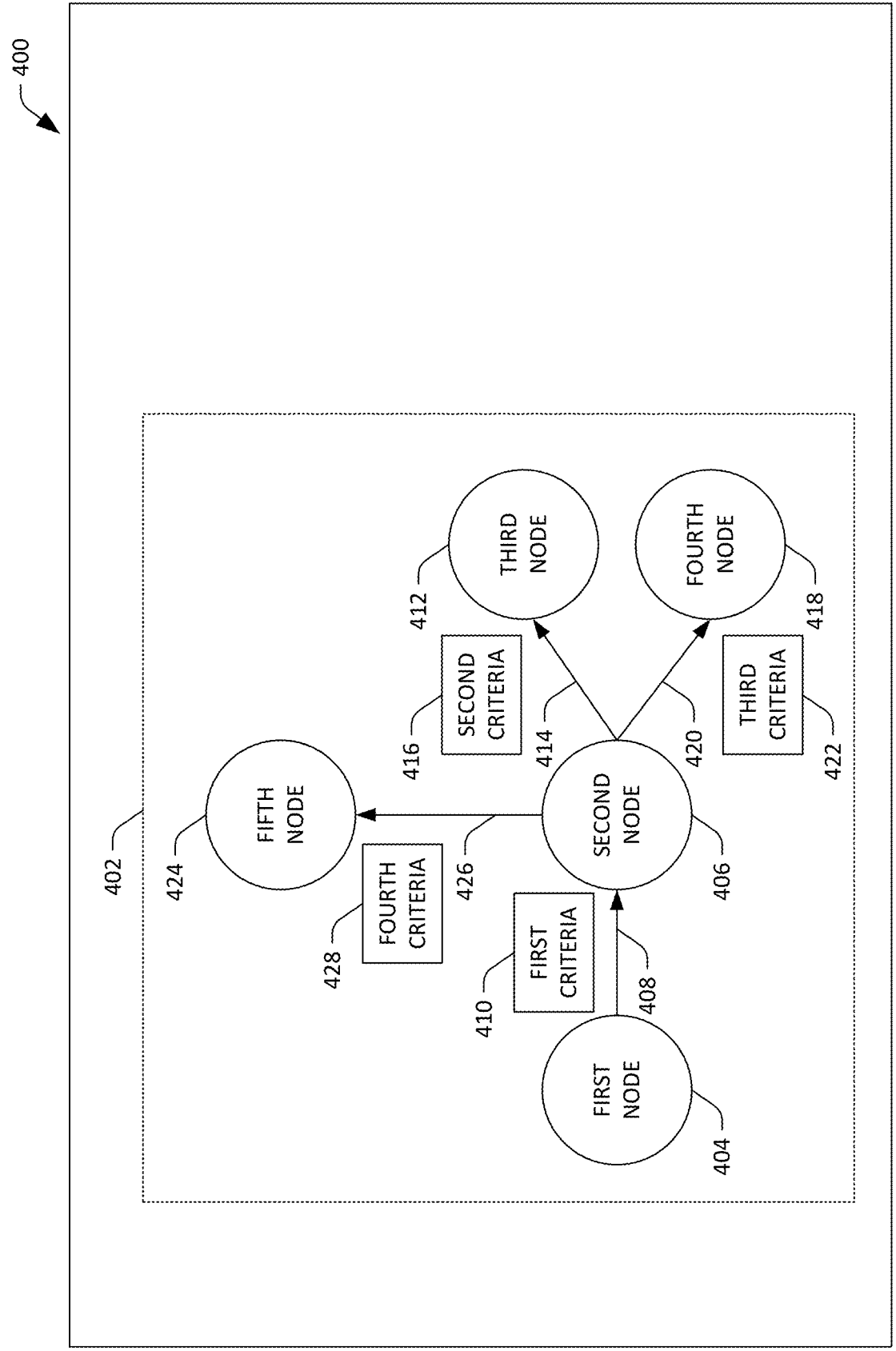

The automation application 110 modifies the directed graph 402 shown in FIG. 4C based upon the fifth input to generate a modified directed graph, and updates the second GUI 400 to display the modified directed graph. Referring now to FIG. 4D, an updated view of the second GUI 400 is illustrated. The automation application 110 has also updated the directed graph 402 to include a fifth node 424 that is assigned to the fifth input and a fourth directed edge 426 that originates from the second node 406 and terminates into the fifth node 424. The automation application 110 assigns the fourth directed edge 426 fourth criteria 428 that are to be satisfied in order to traverse the fourth directed edge 426. In an example, the fourth criteria 428 may be the automation application 110 mimicking the second input (assigned to the second node 406) to the target application 108. The automation application 110 may generate a modified macro based upon the directed graph 402 shown in FIG. 4D. When executing the macro represented by the directed graph 402 shown in FIG. 4D, the automation application 110 mimics the fifth input (i.e., selecting the print record button 310) to the target application 108 in addition to mimicking one of the third input or the fourth input to the target application 108.

It is to be understood that origin nodes and/or termination nodes of directed edges in the directed graph 402 may be modified in order to modify the macro represented by the directed graph 402. In an example, the automation application 110 may receive input from the user 128 that causes the fourth directed edge 426 shown in FIG. 4D to originate from the third node 412 (as opposed to the second node 406). Thus, in the example, when the automation application 110 executes the macro represented by the directed graph 402, the automation application 110 mimics the fifth input to the target application 108 after mimicking the third input to the target application 108 (as opposed to mimicking the third input after the second input).

It is also to be understood that the nodes and/or directed edges in the directed graph 402 may be deleted from the directed graph 402 in order to modify the macro represented by the directed graph 402. For instance, the automation application 110 may receive input from the user 128 which causes the fifth node 424, the fourth directed edge 426, and the fourth criteria 428 to be deleted from the directed graph 402, thereby returning the directed graph 402 (and hence the macro represented by the directed graph 402) to the state shown in FIG. 4C.

It is also to be understood that macros generated by the automation application 110 may be chained together with other macros generated by the automation application 110. For instance, using a process similar to that described above, the automation application 110 may record and generate a second macro that is represented by a second directed graph. The automation application 110 may execute the second macro in order to mimic inputs to the target application 108 (or another target application). Subsequent to generating the second macro, the automation application 110 may receive input from the user 128 which causes the automation application 110 to retrieve the second macro (from the data store 112 or another data store).

Turning now to FIG. 4E, an updated view of the second GUI 400 is illustrated. The automation application 110 may update the second GUI 400 responsive to retrieving the second macro. The second GUI 400 now additionally displays a second directed graph 430 that represents the second macro retrieved by the automation application 110. Although the second directed graph 430 is depicted as a single oval in FIG. 4E, it is to be understood that the second directed graph 430 may comprise many nodes and directed edges (similar to the directed graph 402). The automation application 110 may also receive input from the user 128 which causes a fifth directed edge 432 to be added to the directed graph 402, the fifth directed edge 432 originating from the fourth node 418 and terminating into a node in the second directed graph 430. The automation application 110 may also receive (as input from the user 128) fifth criteria 434 that are to be satisfied in order for the automation application 110 to traverse the fifth directed edge 432. The automation application 110 then generates a modified macro based upon the directed graph shown in FIG. 4E.

Figure 4F:
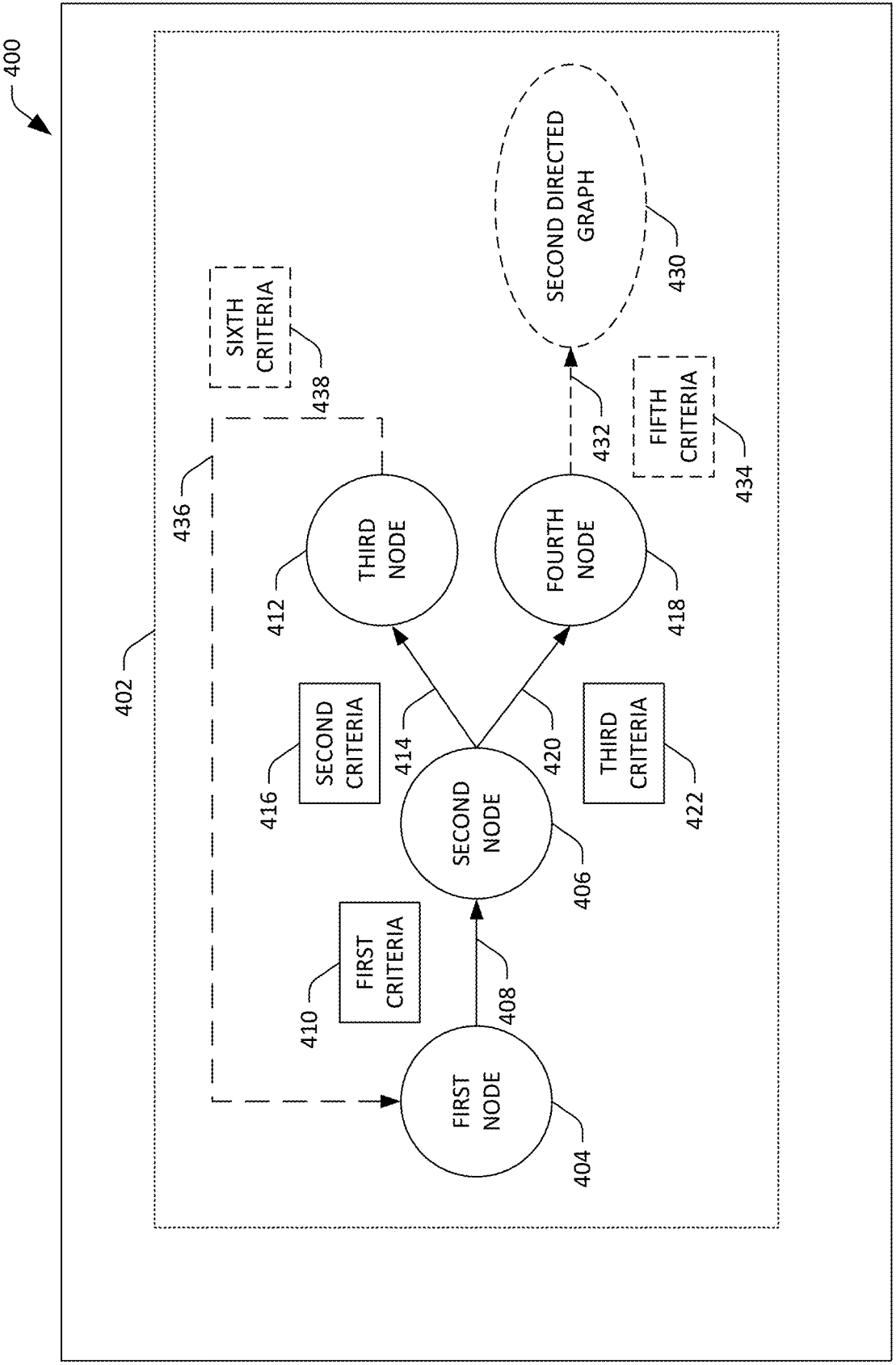

It is also to be understood that the automation application 110 supports looping functionality via the second GUI 400. Turning now to FIG. 4F, the automation application 110 has received input from the user 128 causing the automation application 110 to add a sixth directed edge 436 and sixth criteria 438 to the directed graph 402 shown in FIG. 4E. The sixth directed edge 436 originates from the third node 412 and terminates into the first node 404. Thus, the sixth directed edge 436 forms a loop within the directed graph 402. The sixth criteria 438 must be satisfied in order for the automation application 110 to traverse the sixth directed edge 436. The automation application 110 may ensure that the sixth criteria 438 will not always be true in order to prevent an infinite loop from occurring when executing the macro represented by the directed graph 402. Alternatively, the automation application 110 may negatively define the sixth criteria 438, that is, the sixth criteria 438 may specify conditions upon which the automation application 110 is to cease traversing the sixth directed edge 436. In an example, the sixth criteria 438 may specify that the automation application 110 is not traverse the sixth directed edge 436 when an input in the macro has been mimicked a certain number of times, when a particular window appears within the first GUI 300 for the target application 108, and so forth. Although not depicted in FIG. 4F, it is to be understood that the automation application 110 also enables creation of nested loops via the second GUI 400. The automation application 110 then generates a modified macro based upon the directed graph shown in FIG. 4F.

Figure 4G:
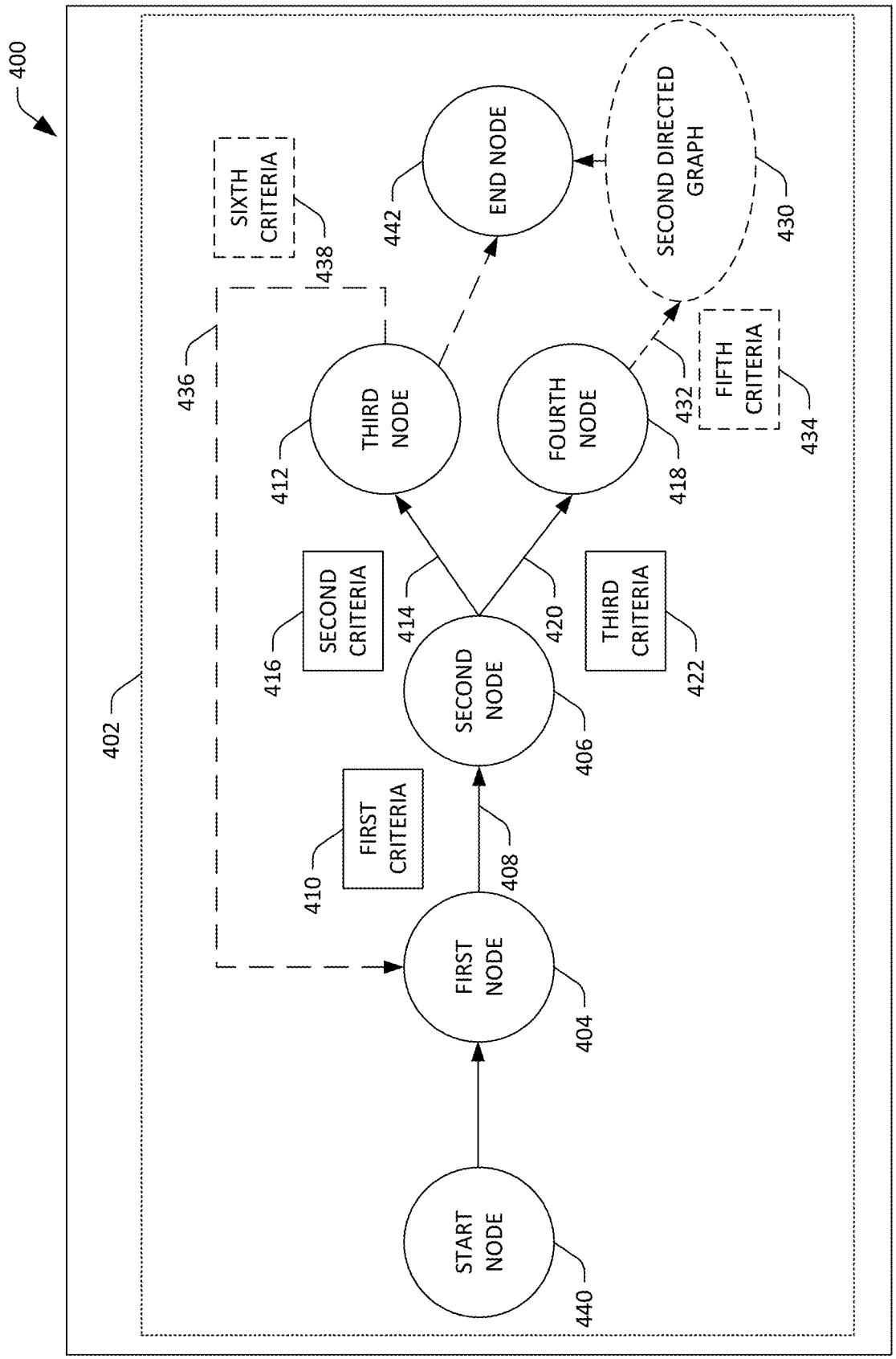

In an embodiment, the automation application 110 may not assign all nodes in the directed graph 402 to a respective input. Referring now to FIG. 4G, the automation application 110 has updated the second GUI 400 to display a start node 440 and an end node 442. The start node 440 and the end node 442 are not assigned to inputs that are to be mimicked to the target application 108 when the automation application 110 executes the macro represented by the directed graph 402. Rather, the start node 440 and the end node 442 represent an entry and exit, respectively, into the macro. While many different directed edges may originate from the start node 440, directed edges may not terminate into the start node 440. Likewise, while many different directed edges may terminate into the end node 442, directed edges may not originate from the end node 442.

Start criteria (not shown in FIG. 4G) are assigned to the directed edge (or directed edges) originating from the start node 440. The start criteria must be satisfied in order for the automation application 110 to begin mimicking inputs to the target application 108 (e.g., the first input assigned to the first node 404). End criteria (not shown in FIG. 4G) are assigned to the directed edges terminating into the end node 442. The end criteria must be satisfied in order for the automation application 110 to cease execution of the macro. It is to be understood that the start node 440 and the end node 442 may be omitted from the second GUI 400 for convenience of the user 128, such as in cases where execution of the macro is not conditioned upon the start criteria. Furthermore, although FIG. 4G depicts many nodes and directed edges, it is to be understood that the start node 440 and the end node 442 may be connected to a single node in a directed graph 402.

It is to be understood that modifications to the directed graph 402 may cause directed edges of the directed graph 402 to cross one another, thus making interpretation of the directed graph 402 by the user 128 challenging. For instance, prior to receiving a modification, the directed graph 402 may have a first number of directed edges that cross one another. Subsequent to receiving the modification, the directed graph 402 may have a second number of directed edges that cross one another, the second number being greater than the first number. The automation application 110 may execute a graph drawing algorithm over the directed graph 402 that causes the directed graph 402 to have a third number of directed edges that cross one another, the third number being less than the second number. Thus, the automation application 110 may reduce the number of directed edges that cross one another to enable the user 128 to more easily interpret the macro represented by the directed graph 402.

Figure 5A:
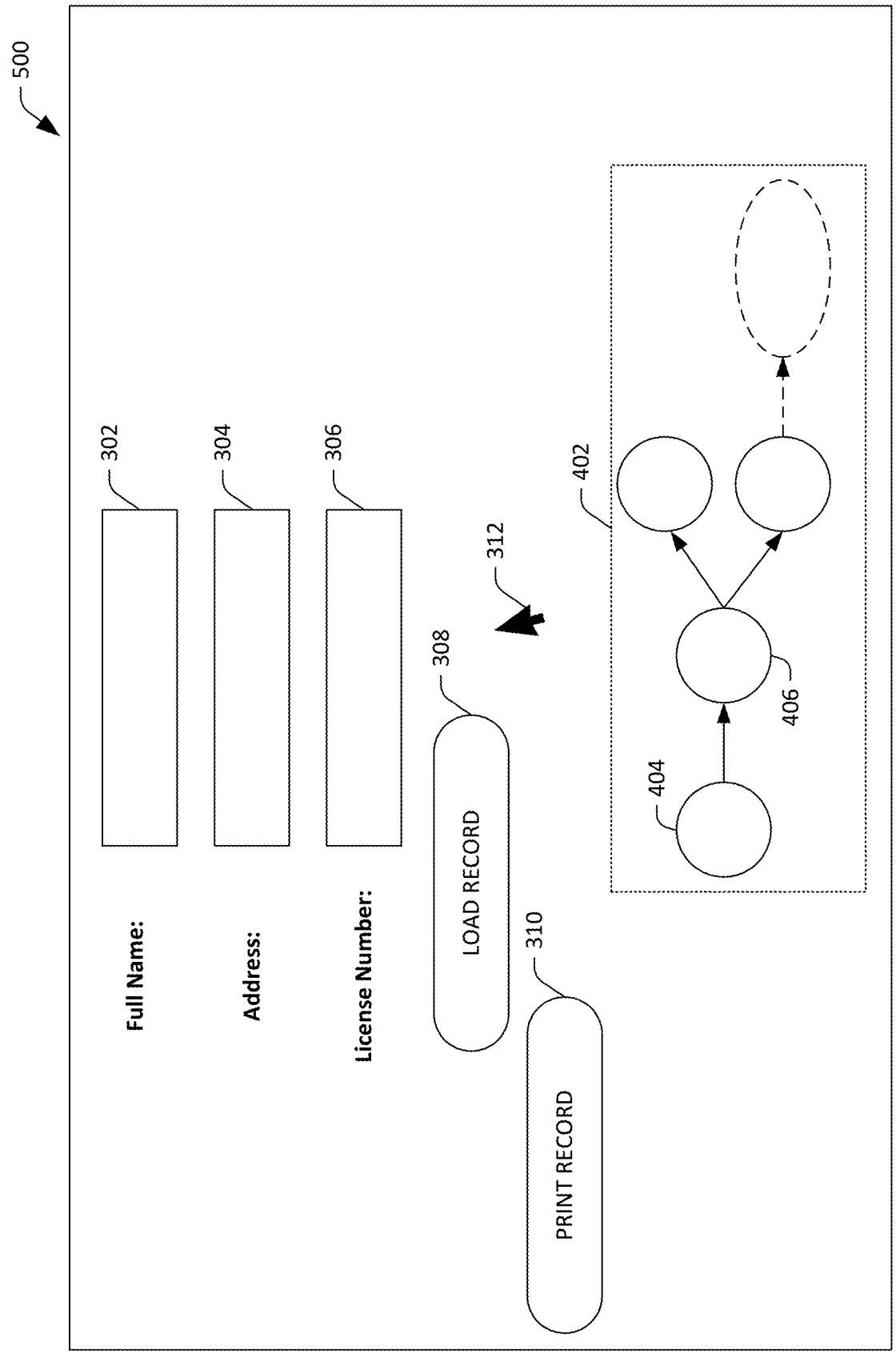
FIGS. 5A-5C are illustrations of exemplary GUIs for an automation application.
Figure 5B:
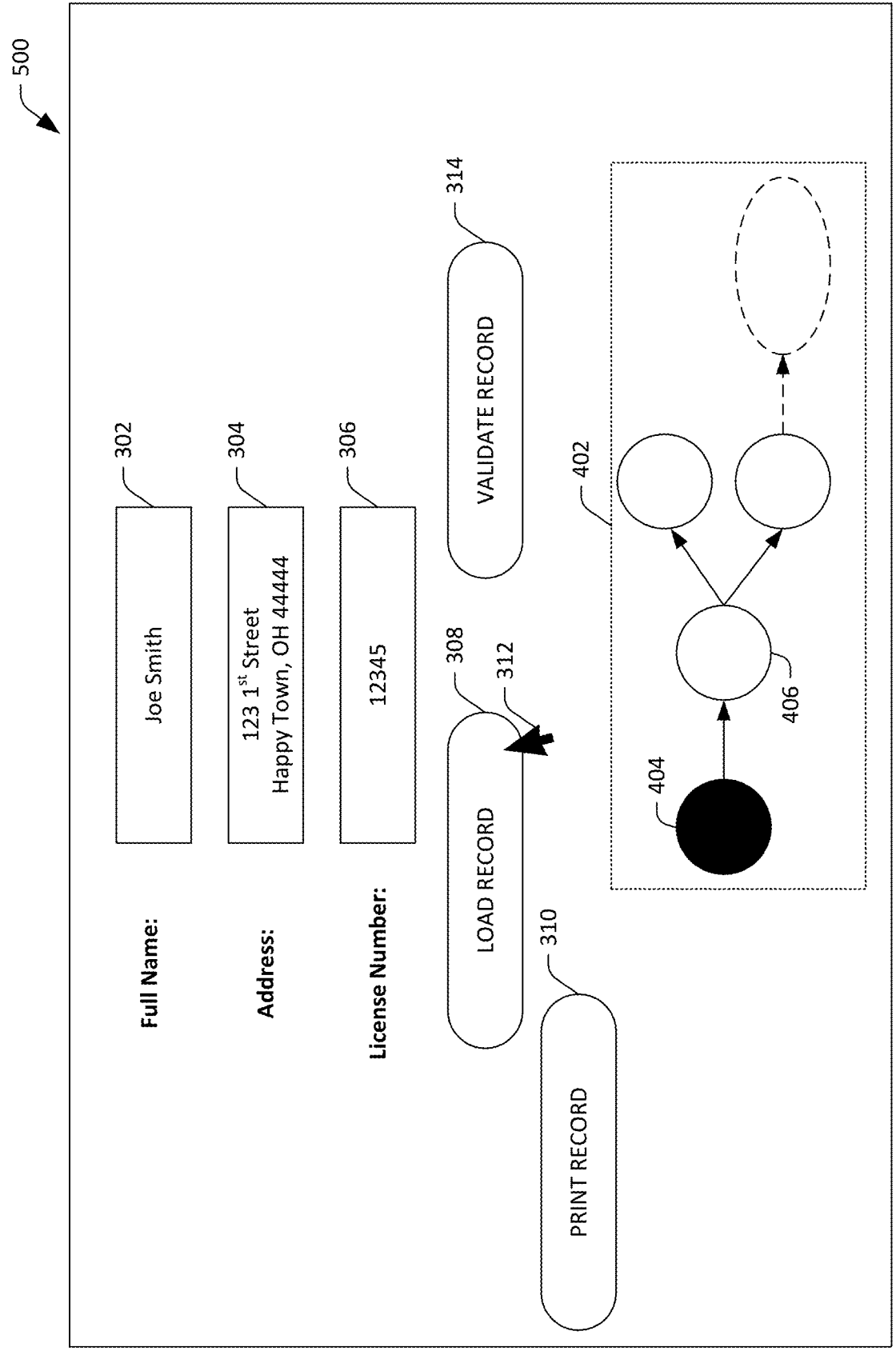
Figure 5C:
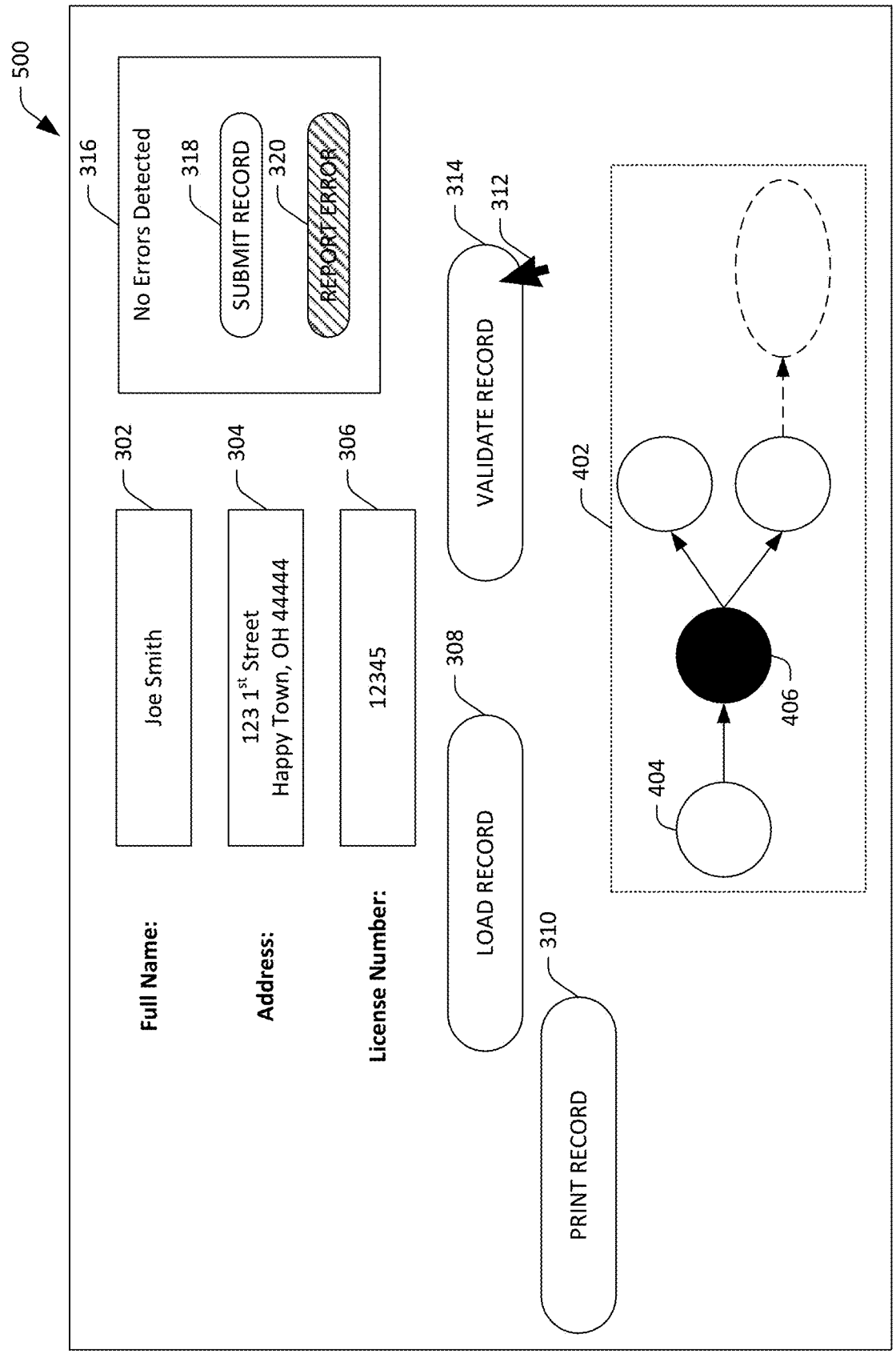

FIGS. 5A-5C illustrate a GUI 500 facilitating verification functionality of the automation application 110. Referring now to FIG. 5A, the GUI 500 for the automation application 110 (also referred to herein as "the third GUI 500") is illustrated. The automation application 110 may cause the third GUI 500 to be presented on the display 122 as part of the graphical features 124 when the user 128 wishes to verify that the macro described above (in FIGS. 3A-3D and 4A-4G) is working as intended. The third GUI 500 comprises the directed graph 402 described above in the description of FIGS. 4A-4G. The third GUI 500 further comprises a screen shot of the first GUI 300 described above in the description of FIG. 3A.

Responsive to receiving an indication from the user 128, the automation application 110 begins to execute the macro represented by the directed graph 402 by mimicking inputs assigned to the nodes in the directed graph 402 to the target application 108. Concurrently with mimicking the first input assigned to the first node 404, the automation application 110 updates the third GUI 500 to a state shown in FIG. 5B. As shown in FIG. 5B, the third GUI 500 now displays a screen shot of the target application 108 as shown in FIG. 3B. Additionally, the automation application 110 visually highlights the first node 404 within the directed graph 402 concurrently with displaying the screen shot of the target application 108.

Responsive to determining that the first criteria 410 assigned to the first directed edge 408 have been satisfied, the automation application 110 mimics the second input assigned to the second node 406 to the target application 108. As shown in FIG. 5C, the automation application 110 displays a screen shot of the target application 108 as shown in FIG. 3C concurrently with mimicking the second input. The automation application 110 also visually highlights the second node 406 within the directed graph 402 concurrently with displaying the screen shot of the target application 108.

The automation application 110 repeats the process described in FIGS. 5A-5C for each node in the directed graph 402 in order to aid the user 128 in simultaneously visualizing (1) an input that is mimicked during macro execution and (2) a resultant screen shot of the target application 108 when or immediately after the automation application 110 mimics the input to the target application 108.

In an embodiment, the automation application 110 may filter elements (e.g., the print record button 310) from the screen shots shown in the third GUI 500 illustrated in FIGS. 5A-5C. This is advantageous in scenarios in which a screen shot contains elements that are not relevant to execution of the macro. Furthermore, the automation application 110 may label elements (e.g., the load record button 308) from the screen shot shown in the third GUI 500 in order to aid the user 128 in visually identifying elements that are important during execution of the macro.

The above-described technologies present various advantages over conventional technologies. First, unlike conventional macros, the above-described technologies are adaptable to computing devices with varying characteristics, such as varying display resolutions, varying font sizes, and/or varying aspect ratios. Second, unlike conventional macros, the automation application described above has the ability to correlate the sequence of inputs with screen states and operating system processes in order to efficiently execute a macro. By maintaining both an order of the sequence of inputs and timestamps for the sequence of inputs, the automation application avoids performance delays associated with conventional macro applications. Third, unlike techniques that employ specialized programming tools, the above-described technologies may be readily employed by users that lack programming knowledge. More specifically, the GUIs for the automation application described above enable the users to intuitively generate, modify, verify, and execute macros.

Figure 6:
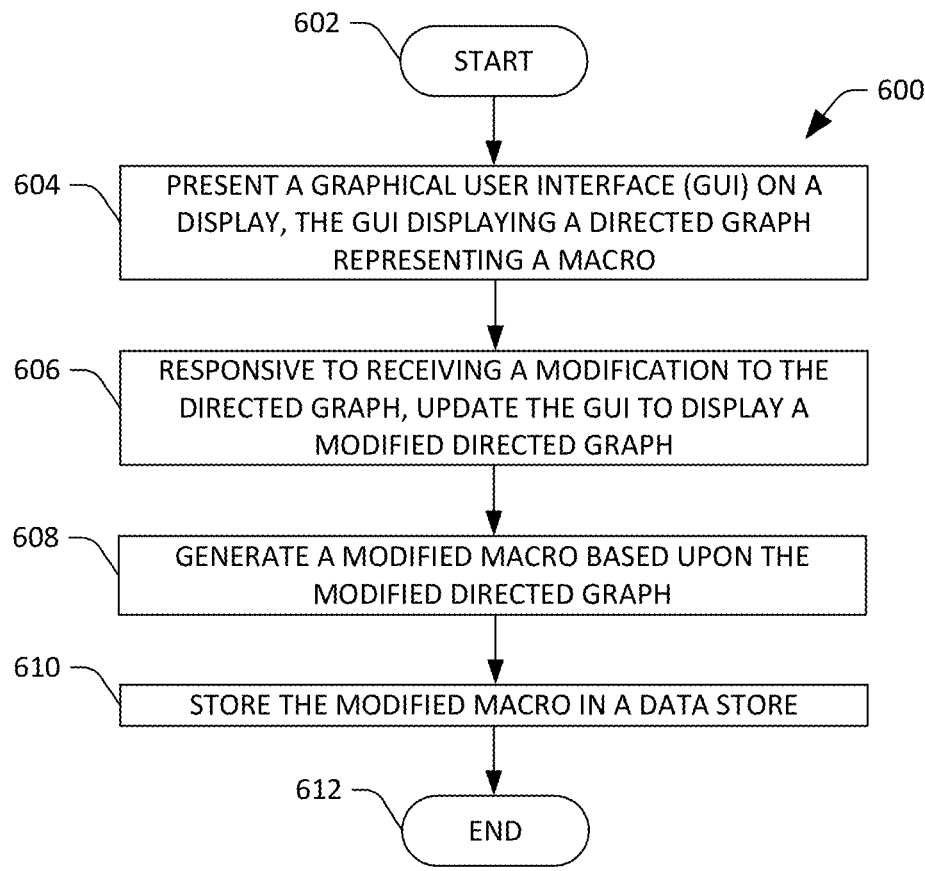
FIG. 6 is a flow diagram that illustrates an exemplary methodology performed by a computing device for modifying a macro.
Figure 7:
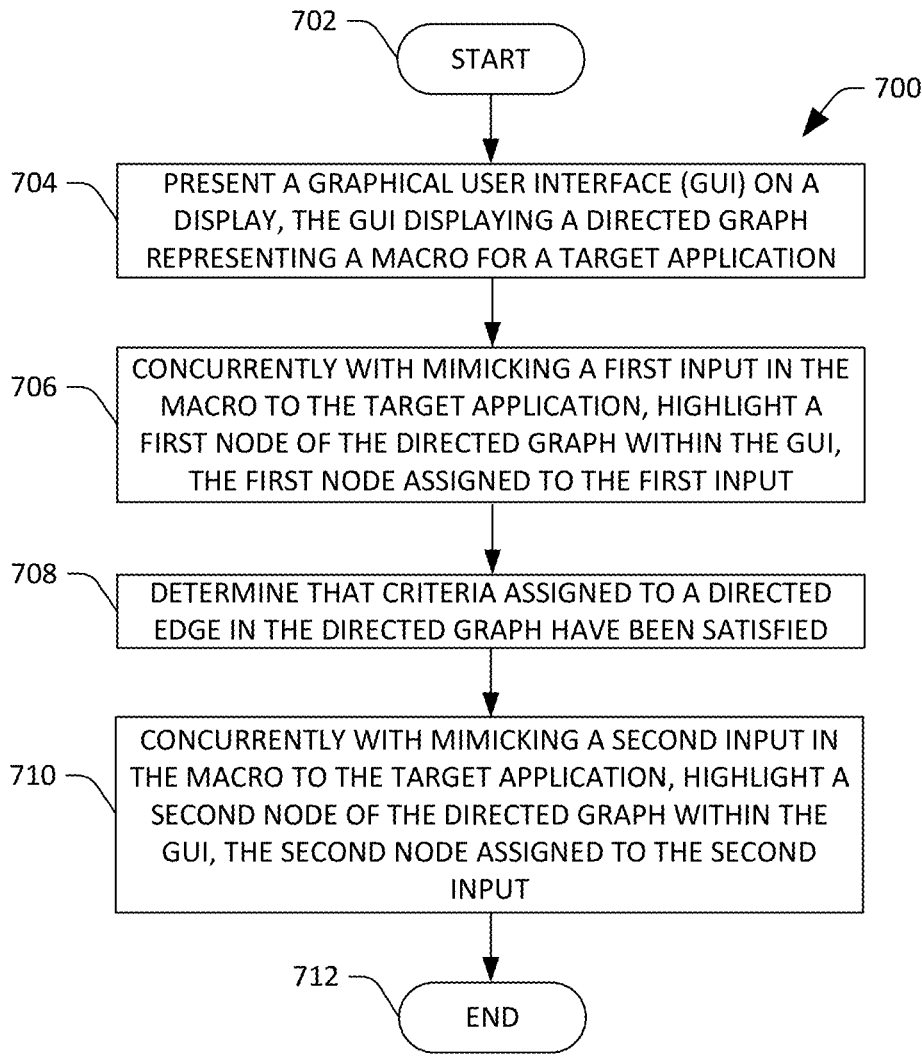
FIG. 7 is a flow diagram that illustrates an exemplary methodology performed by a computing device for verifying a macro.

FIGS. 6 and 7 illustrate exemplary methodologies relating to macros. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, a methodology 600 executed by a computing device that facilitates modifying a macro is illustrated. The methodology 600 begins at 602, and at 604 the computing device presents a GUI for an automation application on a display. The GUI displays a directed graph representing a macro for a target application. The directed graph comprises nodes and directed edges connecting the nodes, wherein each node is assigned to an input received by the target application during recording of the macro, wherein each directed edge is assigned criteria that are to be satisfied in order to traverse each directed edge. At 606, responsive to receiving a modification to the directed graph, the computing device updates the GUI for the automation application to display a modified directed graph based upon the modification. At 608, the computing device generates a modified macro based upon the modified directed graph. Subsequently, at 610, the computing device stores the modified macro in a data store. The methodology 600 concludes at 612.

With reference now to FIG. 7, a methodology 700 executed by a computing device that facilitates verifying a macro for a target application is illustrated. The methodology 700 begins at 702, and at 704 the computing device presents GUI on a display, wherein the GUI displays a directed graph representing a macro, the directed graph comprising a first node, a second node, and a directed edge. The first node is assigned to a first input of the macro. The second node is assigned to a second input of the macro. The directed edge is assigned criteria that are to be satisfied in order for the computing device to traverse the directed edge (and by extension mimic the second input to the target application). At 706, concurrently with mimicking the first input to the target application, the computing device highlights the first node within the GUI. At 708, the computing device determines that the criteria assigned to the directed edge have been satisfied. At 710, concurrently with mimicking the second input to the target application, the computing device highlights the second node within the GUI. The methodology 700 concludes at 712.

Figure 8:
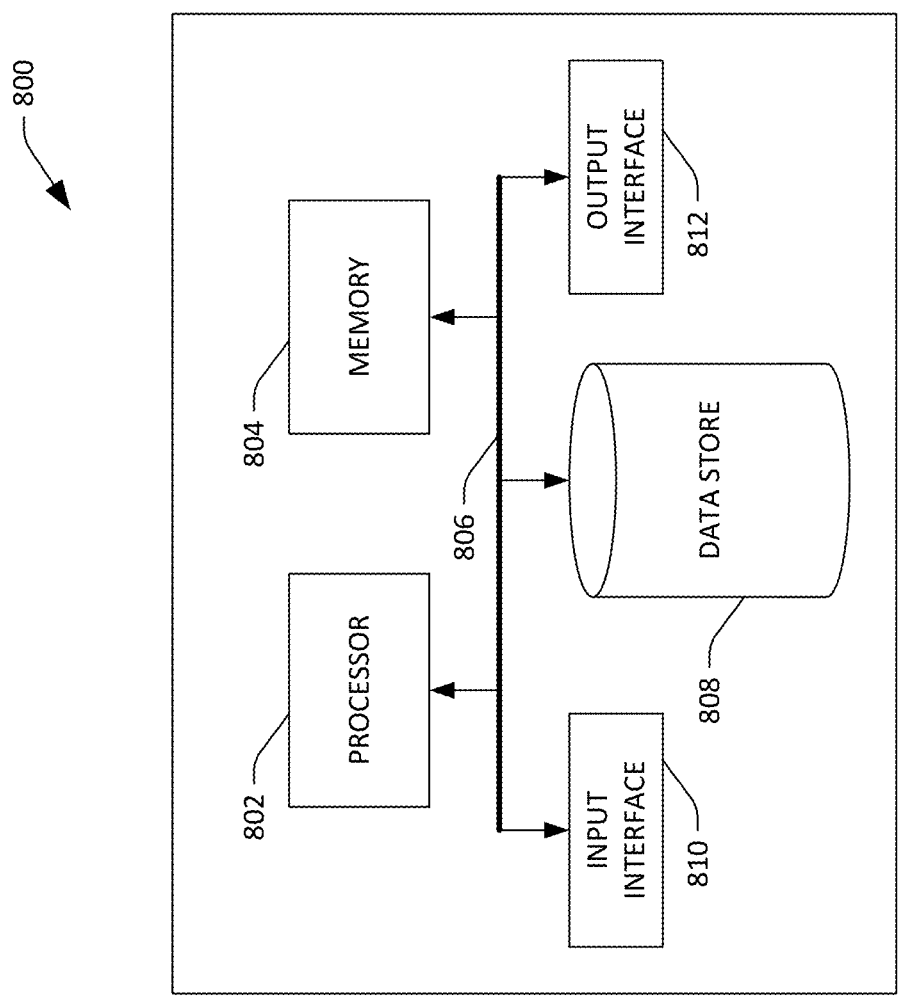
FIG. 8 is an exemplary computing system.

Referring now to FIG. 8, a high-level illustration of an example computing device 800 that is used in accordance with the systems and methodologies disclosed herein is illustrated. In one example, the computing device 800 is used in a system that presents a GUI that presents a directed graph that represents a macro. In another example, the computing device 800 is used in a system that executes a macro. The computing device 800 includes at least one processor 802 that executes instructions that are stored in a memory 804. In an example, the instructions are instructions for implementing functionality described as being carried out by one or more components discussed above or instructions for implementing one or more of the methods described above. The processor 802 may access the memory 804 by way of a system bus 806. In an example, in addition to storing executable instructions, the memory 804 stores macros, screen states, directed graphs, application data, etc.

The computing device 800 additionally includes a data store 808 that is accessible by the processor 802 by way of the system bus 806. In an example, the data store 808 includes executable instructions, macros, screen states, directed graphs, application data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface

810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device comprising:
   a processor;
   a display; and
   memory storing an automation application, wherein the automation application, when executed by the processor, causes the processor to perform acts comprising:
   presenting a graphical user interface (GUI) for the automation application on the display, wherein the GUI for the automation application displays a directed graph representing a macro for a target application, the directed graph comprising nodes and directed edges connecting the nodes, wherein each node in the nodes is assigned to an input received by the target application during recording of the macro, wherein each directed edge in the directed edges is assigned criteria that are to be satisfied in order to traverse each directed edge;
   responsive to receiving a modification to the directed graph, updating the GUI for the automation application to display a modified directed graph based upon the modification; and
   generating a modified macro based upon the modified directed graph.

2. The computing device of claim 1, wherein the directed graph comprises:
   a first node assigned to a first input received by the target application during recording of the macro;
   a second node assigned to a second input received by the target application during recording of the macro; and
   a first directed edge that originates from the first node and terminates into the second node, wherein the first directed edge is assigned first criteria that are to be satisfied in order to traverse the first directed edge.

3. The computing device of claim 2, the acts further comprising:
   prior to presenting the GUI for the automation application on the display, recording the macro for the target application, wherein recording the macro for the target application comprises:
   receiving the first input from a user of the computing device;
   recording the first input, a first screen state of the target application as the target application receives the first input, first operating system processes that are performed by an operating system as the target application receives the first input, and first evidence events obtained from the operating system processes;
   receiving the second input from the user;
   recording the second input, a second screen state of the target application as the target application receives the second input, second operating system processes that are performed by the operating system as the target application receives the second input, and second evidence events obtained from the operating system processes; and generating the macro based upon the first input, the first screen state, the first operating system processes, the first evidence events, the second input, the second screen state, the second operating system processes, and the second evidence events.

4. The computing device of claim 2, wherein the modification to the directed graph comprises adding a second directed edge to the directed graph, the second directed edge originating from the second node and terminating into the first node, the acts further comprising:

receiving second criteria for the second directed edge from a user of the computing device, the second criteria are to be satisfied in order to traverse the second directed edge.

5. The computing device of claim 2, wherein the modification to the directed graph comprises:

adding a third node to the directed graph, the third node assigned to a third input received by the target application during recording of the macro; and adding a second directed edge to the directed graph that originates from the second node and terminates into the third node, wherein the second directed edge is assigned second criteria that are to be satisfied in order to traverse the second directed edge.

6. The computing device of claim 5, the acts further comprising:

executing the modified macro, wherein executing the modified macro comprises:

mimicking the first input to the target application;

responsive to determining that the first criteria have been satisfied, mimicking the second input to the target application; and responsive to determining that the second criteria have been satisfied, mimicking the third input to the target application.

7. The computing device of claim 5, wherein the modification to the directed graph further comprises:

adding a fourth node to the directed graph, the fourth node assigned to a fourth input received by the target application during recording of the macro; and adding a third directed edge to the directed graph that originates from the second node and terminates into the fourth node, wherein the third directed edge is assigned third criteria that are to be satisfied in order to traverse the third directed edge.

8. The computing device of claim 7, wherein the second criteria comprise evaluating an expression as true, wherein the third criteria comprise evaluating the expression as false, wherein the expression is based upon a screen state of the target application when or immediately after the automation application mimics the second input to the target application during execution of the modified macro.

9. The computing device of claim 1, the acts further comprising:

responsive to receiving a selection of a node in the nodes from the user, displaying a screen shot of the target application when or immediately after the target application received an input assigned to the node when the macro was recorded.

10. The computing device of claim 1, wherein the modification to the directed graph comprises:

retrieving a second macro that has been generated by the automation application from a data store;

updating the GUI for the automation application to display a second directed graph representing the second macro;

receiving a selection of a first node in the directed graph and a second node in the second directed graph; and adding a directed edge that originates from the first node and terminates into the second node, thereby causing the modified directed graph to be displayed.

11. The computing device of claim 1, wherein the directed graph has a first number of directed edges that cross one another, wherein the modification to the directed graph causes a second number of directed edges in the modified directed graph to cross one another, the second number being greater than the first number, the acts further comprising:

executing a graph drawing algorithm on the modified directed graph, wherein executing the graph drawing algorithm on the modified directed graph causes the modified directed graph displayed in the GUI for the automation application to have a third number of directed edges that cross one another, the third number being less than the second number.

12. The computing device of claim 1, wherein the GUI for the automation application further displays indications of the criteria.

13. The computing device of claim 1, wherein the target application performs a first action when the automation application executes the macro, wherein target application performs a second action when the automation application executes the modified macro.

14. A method executed by a processor of a computing device while the processor executes an automation application, the method comprising:

presenting a graphical user interface (GUI) for the automation application on a display, wherein the GUI for the automation application displays a directed graph representing a macro for a target application, the directed graph comprising nodes and directed edges connecting the nodes, wherein each node in the nodes is assigned to an input received by the target application during recording of the macro, wherein each directed edge in the directed edges is assigned criteria that are to be satisfied in order to traverse each directed edge;

responsive to receiving a modification to the directed graph, updating the GUI for the automation application to display a modified directed graph based upon the modification;

generating a modified macro based upon the modified directed graph; and storing the modified macro in a data store that is accessible to the automation application.

15. The method of claim 14, wherein the modified directed graph comprises:

a first node assigned to a first input received by the target application during recording of the macro;

a second node assigned to a second input received by the target application during recording of the macro; and a first directed edge that originates from the first node and terminates into the second node, wherein the first directed edge is assigned first criteria that are to be satisfied in order to traverse the first directed edge.

16. The method of claim 15, wherein the GUI for the automation application further displays a first label and a second label, wherein the first label identifies the first input, wherein the second label identifies the second input.

17. The method of claim 15, further comprising:
executing the modified macro, wherein executing the modified macro comprises:
mimicking the first input to the target application; and
responsive to determining that the first criteria have been satisfied, mimicking the second input to the target application.

18. The method of claim 17, further comprising:
concurrently with mimicking the first input to the target application:
visually highlighting the first node in the directed graph within the GUI for the automation application; and
updating the GUI for the automation application to display a first screen shot of the target application when or immediately after the target application received the first input; and
concurrently with mimicking the second input to the target application:
visually highlighting the second node in the directed graph within the GUI for the automation application; and
updating the GUI for the automation application to display a second screen shot of the target application when or immediately after the target application received the second input.

19. The method of claim 14, further comprising:
receiving the criteria from a user of the computing device, wherein the criteria include at least one of:
evaluating text located in a screen state of the target application against a constant text value;
evaluating a position of the text in the screen state against a constant set of coordinates in the screen state;
evaluating the position of the text in the screen state against a variable set of coordinates in the screen state;
evaluating the text in the screen state against a data element;
evaluating the text in the screen state against an expression;
evaluating the text in the screen state against second text in a prior screen state in the screen states; or
evaluating the text in the screen state against second text located in the screen state; and
assigning the criteria to the directed edges comprised by the directed graph.

20. A computer-readable storage medium comprising an automation application that, when executed by a processor of a computing device, causes the processor to perform acts comprising:
presenting a graphical user interface (GUI) for the automation application on a display, wherein the GUI for the automation application displays a directed graph representing a macro for a target application, the directed graph comprising:
a start node;
a first node assigned to a first input received by the target application during recording of the macro;
an end node;
a first directed edge originating from the start node and terminating into the first node, wherein the first directed edge is assigned start criteria that are to be satisfied in order to traverse the first directed edge; and
a second directed edge originating from the first node and terminating into the end node, wherein the second directed edge is assigned end criteria that are to be satisfied in order to traverse the second directed edge;
responsive to receiving a modification to the directed graph, updating the GUI for the automation application to display a modified directed graph based upon the modification, wherein the modification causes a second node and a third directed edge to be added to the directed graph, wherein the second node is assigned to a second input received by the target application during recording of the macro, wherein the third directed edge connects the second node to the directed graph, wherein the third directed edge is assigned third criteria that are to be satisfied in order to traverse the third directed edge; and
generating a modified macro based upon the modified directed graph.

* * * * *